(12) United States Patent
Sugaya

(10) Patent No.: US 8,989,170 B2
(45) Date of Patent: Mar. 24, 2015

(54) WIRELESS COMMUNICATION SYSTEM AND WIRELESS COMMUNICATION CONTROL METHOD, WIRELESS COMMUNICATION DEVICE AND WIRELESS COMMUNICATION METHOD, AND COMPUTER PROGRAM

(71) Applicant: Sony Corporation, Tokyo (JP)

(72) Inventor: Shigeru Sugaya, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/037,629

(22) Filed: Sep. 26, 2013

(65) Prior Publication Data

US 2014/0029588 A1 Jan. 30, 2014

Related U.S. Application Data

(63) Continuation of application No. 13/452,013, filed on Apr. 20, 2012, which is a continuation of application No. 12/487,015, filed on Jun. 18, 2009, now Pat. No. 8,199,682, which is a continuation of application No. 10/469,281, filed as application No. PCT/JP03/00832 on Jan. 29, 2003, now Pat. No. 7,561,539.

(30) Foreign Application Priority Data

Feb. 5, 2002 (JP) ................................ P2002-028128

(51) Int. Cl.
*H04W 52/02* (2009.01)
*H04L 5/00* (2006.01)
(Continued)

(52) U.S. Cl.
CPC ......... *H04L 5/0092* (2013.01); *H04W 74/0816* (2013.01); *H04W 52/0216* (2013.01); *H04W 68/00* (2013.01); *H04W 84/18* (2013.01)
USPC ............ 370/345; 455/231; 370/318; 370/349

(58) Field of Classification Search
None
See application file for complete search history.

(56) References Cited

U.S. PATENT DOCUMENTS 6,470,004 B1 10/2002 Murata et al.
6,490,256 B1 12/2002 Jones et al.
(Continued)

FOREIGN PATENT DOCUMENTS

EP 0978994 2/2000
EP 1094636 4/2001
(Continued)

OTHER PUBLICATIONS

"Synchronized Multimedia Integration Language (SMIL) 1.0 Specification" Internet Citation, Jun. 15, 1998, http://www.w3.org/tr/rec-SMIL.

(Continued)

*Primary Examiner* — Jianye Wu
(74) *Attorney, Agent, or Firm* — Sherr & Jiang, PLLC

(57) ABSTRACT

A wireless communication device in a wireless network sets management information notification cycles at specified time intervals and transmits management information containing receive timing information showing its own position to start receiving information, receive window information, and receive cycle information. Another wireless communication device receiving that management information links it to a communication device number for the corresponding wireless communication device and stores the receive timing, the receive window information, and the receive cycle information. When sending information, the receive start position of the corresponding communication device is found from the receive timing information, the receive window information, and the receive cycle information of the other communication and information is then transmitted at that timing. An asynchronous ad-hoc communication wireless network can therefore be configured without a particular control station.

28 Claims, 16 Drawing Sheets

(51) Int. Cl.
*H04W 74/08* (2009.01)
*H04W 68/00* (2009.01)
*H04W 84/18* (2009.01)

(56) References Cited

U.S. PATENT DOCUMENTS

| | | | |
|---|---|---|---|
| 6,556,582 | B1 | 4/2003 | Redi |
| 6,611,521 | B1 | 8/2003 | McKay et al. |
| 6,693,891 | B1 | 2/2004 | Sugita et al. |
| 6,757,258 | B1 | 6/2004 | Pillay-Esnault |
| 7,031,293 | B1 | 4/2006 | Srikrishna et al. |
| 7,184,413 | B2 | 2/2007 | Beyer et al. |
| 7,280,555 | B2 | 10/2007 | Stanforth et al. |
| 7,492,248 | B1 * | 2/2009 | Bjorkland et al. ............ 340/7.2 |
| 2002/0018458 | A1 | 2/2002 | Aiello et al. |
| 2002/0061031 | A1 * | 5/2002 | Sugar et al. .................. 370/466 |
| 2002/0093929 | A1 * | 7/2002 | Mangold et al. ............. 370/336 |
| 2002/0150050 | A1 * | 10/2002 | Nathanson ................... 370/241 |
| 2003/0058886 | A1 | 3/2003 | Stanforth et al. |
| 2003/0133427 | A1 | 7/2003 | Cimini et al. |
| 2003/0161340 | A1 * | 8/2003 | Sherman ....................... 370/445 |
| 2003/0210898 | A1 | 11/2003 | Juen et al. |
| 2004/0056087 | A1 | 3/2004 | Bonneau et al. |
| 2004/0184775 | A1 | 9/2004 | Nakamura et al. |
| 2005/0237865 | A1 | 10/2005 | Ando et al. |
| 2006/0039281 | A1 * | 2/2006 | Benveniste ................... 370/230 |
| 2006/0126451 | A1 | 6/2006 | Shinkai et al. |
| 2006/0195486 | A1 | 8/2006 | Ohno et al. |

FOREIGN PATENT DOCUMENTS

| | | |
|---|---|---|
| EP | 1632947 | 3/2006 |
| EP | 1653466 | 5/2006 |
| JP | 11-341434 | 12/1999 |
| JP | 2000-021086 | 1/2000 |
| JP | 2001-169331 | 6/2001 |
| JP | 2003-052040 | 2/2003 |
| JP | 2003-061041 | 2/2003 |
| JP | 2004-127426 | 4/2004 |
| JP | 2004-328034 | 11/2004 |
| JP | 2004-328073 | 11/2004 |
| JP | 2005-004850 | 1/2005 |
| JP | 2005-005915 | 1/2005 |
| JP | 2005-236950 | 9/2005 |
| JP | 2005-309503 | 11/2005 |
| JP | 2005-309504 | 11/2005 |
| JP | 2006-107580 | 4/2006 |
| JP | 2006-127560 | 5/2006 |
| KR | 20010041736 | 1/2003 |
| WO | WO00/28544 | 5/2000 |
| WO | WO0042737 | 7/2000 |
| WO | WO0111830 | 2/2001 |
| WO | WO2004042724 | 5/2004 |
| WO | WO2006/033279 | 3/2006 |

OTHER PUBLICATIONS

U.S. Appl. No. 11/880,793.
U.S. Appl. No. 11/904,286.
U.S. Appl. No. 11/906,064.
U.S. Appl. No. 11/897,546.
European Search Report, EP 07 25 3866.
Talucci, F.; Garla, "M.MACA-BI (MACA by invitation). A wireless MAC protocol for high speed ad hoc networking", Universal Personal Communications Record, 1997. Conference Record., 1997 IEEE 6th International Conference on, vol. 2, Oct. 16, 1997, pp. 913 to 917.
Office Action from Korea Application No. 10-03-7011759, dated May 18, 2010.
Supplementary European Search Report EP 03706906, dated Apr. 19, 2011.

* cited by examiner

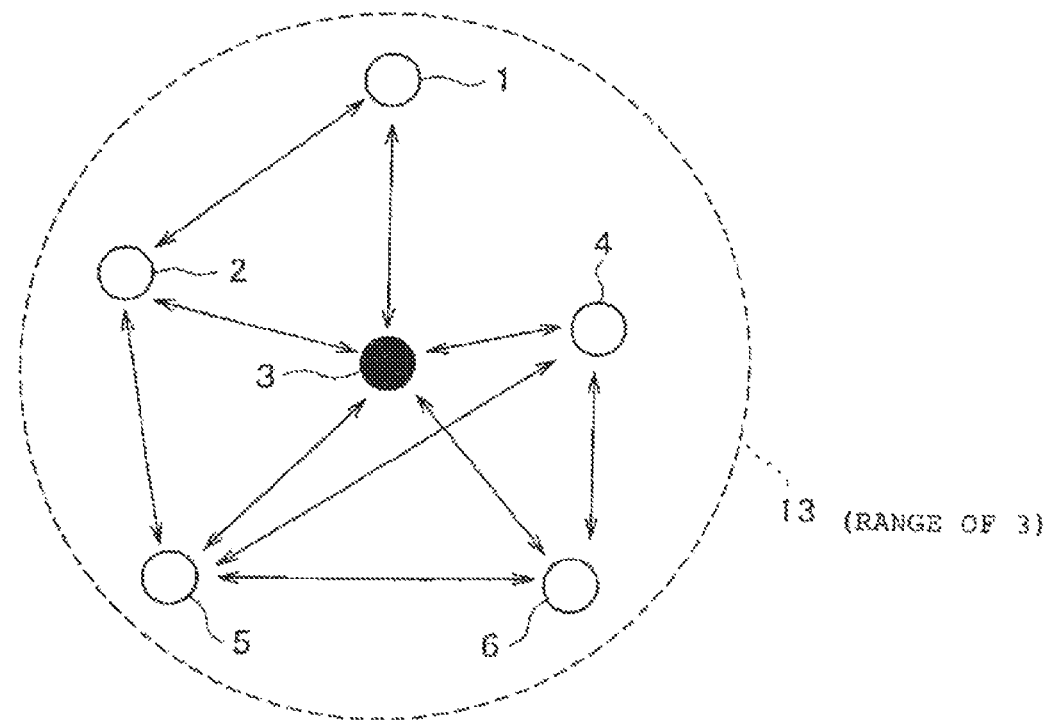
F I G. 10

FIG. 13

| COMMUNICATION DEVICE INFORMATION | INFORMATION ON MANAGEMENT INFORMATION NOTIFICATION CYCLE | REQUEST RECEIVE WINDOW INFORMATION | ACCESSIBLE COMMUNICATION DEVICE INFORMATION | CRC CODE |

FIG. 14

| COMMUNICATION REQUEST TRANSMITTING SOURCE DEVICE INFORMATION | COMMUNICATION REQUEST RECEIVING DESTINATION DEVICE INFORMATION | COMMUNICATION TRAFFIC INFORMATION | COMMUNICATION PARAMETER INFORMATION | CRC CODE |

FIG. 15

| COMMUNICATION CONFIRMATION TRANSMITTING SOURCE DEVICE INFORMATION | COMMUNICATION CONFIRMATION RECEIVING DESTINATION DEVICE INFORMATION | COMMUNICATION TRAFFIC INFORMATION | COMMUNICATION PARAMETER INFORMATION | CRC CODE |

FIG. 16

| COMMUNICATION DATA INFORMATION | CRC CODE |

FIG. 17

| RECEIVE CONFIRMATION INFORMATION | CRC CODE |

WIRELESS COMMUNICATION SYSTEM AND WIRELESS COMMUNICATION CONTROL METHOD, WIRELESS COMMUNICATION DEVICE AND WIRELESS COMMUNICATION METHOD, AND COMPUTER PROGRAM

CROSS-REFERENCE TO RELATED APPLICATIONS

This application is a continuation of U.S. application Ser. No. 13/452,013, filed on Apr. 20, 2012, which is a continuation of U.S. application Ser. No. 12/487,015, filed on Jun. 18, 2009, which is a continuation of U.S. application Ser. No. 10/469,281, filed on Feb. 2, 2004, now U.S. Pat. No. 7,561,539, which is a national stage application under 35 U.S.C. 0371 of International Application No. PCT/JP03/00832, filed Jan. 29, 2003, which claims priority from Japanese Application No. P2002-28128, filed Feb. 5, 2002, the disclosures of which are hereby incorporated herein by reference.

BACKGROUND OF THE INVENTION

1. Technical Field

The present invention relates to a wireless communication system and wireless communication control method, a wireless communication device and wireless communication method, and a computer program for communicating between multiple wireless stations as in a wireless LAN (Local Area Network). More particularly, the present invention relates to a wireless communication system and wireless communication control method, a wireless communication device and wireless communication method, and a computer program for configuring a wireless network by ad-hoc communication without installing a particular device serving as the control station.

More precisely, the present invention relates to a wireless communication device and wireless communication method, a wireless communication device and wireless communication method, and a computer program for configuring a wireless network wherein terminals communicate directly (random access) and asynchronously with each other without installing a particular device serving as the control station, and still more particularly relates to a wireless communication system and wireless communication control method, a wireless communication device and wireless communication method, and a computer program for configuring a wireless network wherein terminals communicate directly (random access) and asynchronously with each other while checking the presence of other terminals.

2. Background Art

Along with increasingly sophisticated computer functions, local area networks (LAN) configured by connecting multiple computers have become a popular method for sharing information such as electronic files and data or peripheral equipment such as printers and for exchanging information by e-mail and data transmission.

In the related art, local area networks (LAN) use optical fibers and coaxial cables or twisted-pair cables and each computer is connected via wire or cable. These wired LAN require installing cables and wiring as well as complicated cable layouts that make it difficult to configure a LAN system. Furthermore, once a LAN system has been configured, equipment and components can only be moved within an area limited by the cable length, making these wired LAN inflexible and inconvenient.

Wireless LAN have become the focus of much attention as network systems that free users from the restrictions of LAN wiring in the related art. These wireless LAN eliminate most of the cable wiring used in work spaces such as in offices and make it relatively easy to move communication terminals such as personal computers (PC).

In recent years, wireless LAN systems have come into increasing demand as their speed becomes faster and cost becomes less expensive. Very recently in particular, personal area networks (PAN) made up of small-scale wireless networks for exchanging information among the multiple pieces of electronic equipment used around people in daily life are under evaluation. The industrial standards IEEE802.11b and IEEE802.11a, for example, are widely known as standards for wireless LAN.

In methods for creating local area networks using wireless technology, one device called the "access point" is installed as a control station in the area, and the network is formed under the overall control of this control station.

In wireless networks installed with this access point, an access control method based on bandwidth reservation is widely employed to transmit information from a communication device. In this method, the bandwidth required to transmit information is reserved at the access point so as to utilize the transmission line without causing conflicts with information transmission by other communication devices. In other words, synchronous wireless communication is performed by installing an access point that permits communication devices in a wireless network to communicate in synchronization with each other.

Another method for configuring a wireless network called "ad-hoc communication" was proposed that allows direct asynchronous communication between terminals. In a small-scale wireless network composed of a relatively small number of clients located near each other, this ad-hoc communication is ideal because all terminals in the network can directly communicate with each other asynchronously without utilizing a particular access point.

In a communication system composed of multiple terminals, access control is essential for preventing communication between terminals from conflicting with each other. Several methods are available for performing access control in a wireless network. These methods can be divided into two groups. One group is channel occupancy methods for example, FDMA (Frequency Division Multiple Access), TDMA (Time Division Multiple Access) and CDMA (Code Division Multiple Access). The other group is channel sharing methods such as ALOHA and CSMA (Carrier Sense Multiple Access). A method called CSMA/CA (Carrier Sense Multiple Access with Collision Avoidance) is commonly used for access control when performing asynchronous communication in small-scale wireless networks.

In an access control method called CSMA/CD (Carrier Sense Multiple Access with Collision Detection), whether or not conflicts are occurring with information transmissions from other communication devices is detected by receiving a self-issued information signal. This method is mainly used in communication using cable and wires. In wireless communication, on the other hand, it is difficult to receive a self-issued information signal. To avoid conflicts in wireless communication, the CDMA/CA method starts transmitting information after checking that there are no information transmissions from other communication devices. This type of access control allows multiple terminals on the same wireless transmission line to share access and communicate with each other (multiple access).

Another example in the related art of transmission methods for communicating by random access is a method wherein all communication devices connected to one network constantly monitor information being sent through the transmission line and the communication device requested to send information then sends it through the transmission line.

Another further example in the related art of transmission methods for asynchronous communication of the related art is a method wherein each communication device decodes all received signals and only detects information sent addressed to that communication device.

However, wireless communication still has the problem that conflicts occur when multiple communication devices start transmitting information simultaneously. To solve this, a corrective method called RTS/CTS was proposed that transmits information after a connection has been established by sending an RTS (Request to Send) to the receiving destination communication device before transmitting information and also by receiving a CTS (Clear to Send) returned from the information receiving destination.

As stated above, an access point is required for controlling access to perform synchronized wireless communication within a wireless network.

In a wireless communication system having this access point, wireless communication must be performed via this access point during asynchronous communication between the transmitting and receiving communication devices. This creates the problem that transmission line utilization efficiency is reduced by half.

Furthermore, when using a system that reserves a portion of the transmission line, the transmission bandwidth must be reserved after the demand has arisen for asynchronous transmission. In a wireless communication system using time division multiplex access (TDMA), this also creates the problem that information cannot be quickly transmitted.

In such wireless communication systems using time division multiplex access, the terminals must be synchronized with each other even during direct transmission between terminals without via the access point, making it difficult to achieve control.

On the other hand, during asynchronous communication in an ad-hoc wireless network in which terminals can communicate directly without utilizing an access point, the transmitting communication device must check in advance for the receiving communication device.

Furthermore, when transmitting information asynchronously, a redundant preamble signal must also be added to the information so that the receiving communication device can detect that the information transmission has already started.

For example, in UBW (Ultra Wide Band) wireless communication that performs high speed data transmission by diffusing the transmission data into an extremely low frequency bandwidth, there is no carrier such as used for wireless communication in the related art. A preamble signal with even higher redundancy must therefore be added to the beginning of the information transmission so that the receiving terminal can initially synchronize with the information signal by detecting whether the signal is present or not.

When performing access control based on the CSMA/CA (Carrier Sense Multiple Access with Collision Avoidance) method, the problem occurs that conflicts cannot be detected if multiple communication devices start transmitting information simultaneously.

Asynchronous communication methods of the related art have the fatal flaw that receiving must be performed all the time to capture information that is sent at an unknown time from a communication device in the network. Wireless communication devices must therefore constantly keep receiving in order to perform asynchronous information transmission by wireless communication, making it impossible to reduce power consumption.

In asynchronous receive methods that must decode all the received signals in order to detect information addressed to itself, a large load is imposed on the receive processing. This requires a high speed processor and/or special devices and therefore increases the cost.

In asynchronous receive methods that must decode all the received signals in order to detect information addressed to itself, a large load is imposed on the receive processing. This requires a high speed processor and/or special devices and therefore increases the cost.

When applying the RTS/CTS access control method to asynchronous wireless communication, each terminal must constantly keep receiving in order to detect the short RTS signal. This constant receiving of course makes it difficult to reduce power consumption. Even though standards exist for the RTS/CTS access control method, it is recognized as less effective for use with communication devices.

It is desirable to provide an excellent wireless communication system and wireless communication control method, a wireless communication device and wireless communication method, and a computer program, wherein terminals can directly communicate with each other without installing a particular device serving as the control station.

It is further desirable to provide an excellent wireless communication system and wireless communication control method, a wireless communication device and wireless communication method, and a computer program, capable of forming a wireless network with terminals communicating directly and asynchronously with each other.

It is still further desirable to provide an excellent wireless communication system and wireless communication control method, a wireless communication device and wireless communication method, and a computer program, capable of forming a wireless network in which terminals communicate asynchronously with each other while checking for the presence of other terminals.

It is also desirable to provide an excellent wireless communication system and wireless communication control method, a wireless communication device and wireless communication method, and a computer program, capable of forming a wireless network in which terminals communicate asynchronously with each other while sending signals containing beacon information to other terminals.

It is yet further desirable to provide an excellent wireless communication system and wireless communication control method, a wireless communication device and wireless communication method, and a computer program, wherein communication devices transmit information asynchronously without being in constant receive standby.

Even further desirable is to provide an excellent wireless communication system and wireless communication control method, a wireless communication device and wireless communication method, and a computer program, whereby communication devices can perform asynchronous wireless communication by RTS/CTS control without being in constant receive standby.

BRIEF SUMMARY OF THE INVENTION

A first aspect of the present invention is a wireless communication system or wireless communication control method for asynchronous information transmission between multiple communication devices, wherein management information containing the receive processing timing of one's own communication device is exchanged between the wireless communication devices; and the transmitting source wireless communication device sends information to the receiving destination wireless communication device, by utilizing the receive processing timing described in the management information.

The term "system" as referred to here, is logical aggregate of multiple devices (or functional module for implementing a designated function) and makes no special reference to whether or not the devices or functional modules are in a single enclosure.

Here, the management information contains timing information for setting the receive window and contains cycle information for setting the receive window so the wireless communication device can perform receive processing. The management information may also contain device ID information unique to each corresponding wireless communication device.

Each wireless communication device links the device ID information upon receiving the management information from other wireless communication devices and in this way multiple wireless communication devices can control the receive processing timing.

Therefore, according to the wireless communication system or wireless communication control method in the first aspect of the present invention, a wireless network can be formed, wherein each wireless communication device checks the presence of the other communication devices by exchanging management information, and performs asynchronous communication based on receive timing described in the management information. In this case, each wireless communication device can communicate directly and asynchronously without installing a particular device serving as the control station.

Furthermore, according to the wireless communication system or wireless communication control method in the first aspect of the present invention, each wireless communication device notifies in advance the other communication devices of its own receive timing, receive window and receive cycle information, and transmits information by utilizing that receive window. In other words, each wireless communication device can communicate asynchronously without being in constant receive standby, thus allowing the receiving function to operate with low power consumption.

Furthermore, according to a wireless communication system or wireless communication control method in the first aspect of the present invention, wireless communication devices can perform wireless communication without having to obtain a means to check in advance on transmission line usage, by transmitting information based on the management information received in the past, so that information transmission is performed in a comparatively short time.

In other words, according to the wireless communication system or wireless communication control method in the first aspect of the present invention, an access control method capable of avoiding conflicts during asynchronous wireless communication can be obtained without using a random access control method for avoiding communication conflicts by carrier sensing control.

In the wireless communication system or wireless communication control method in the first aspect of the present invention, each wireless communication device arranges the receive window by shifting the timing so that receive processing periods do not overlap with periods of other communication devices, thus achieving an access control not prone to conflicts between multiple wireless communication devices.

Also, each wireless communication device may transmit its own management information at each specific cycle, and the management information may contain notification cycle information for transmitting the management information to other wireless communication devices.

Furthermore, each wireless communication device may check in response to receiving the management information whether the corresponding wireless communication device is present in the wireless network, and may also decide that the wireless communication device is no longer present in the wireless network when a specified time (for example, a notification cycle specified in the management information) has elapsed after last receiving the management information.

Specifically, a wireless network system for configuring an autonomous wireless network can be achieved within the communication range of a wireless communication device without having to strictly define the wireless network, by providing a function to decide there is no longer a connection with a wireless communication device and delete it from the memory when no signals containing the identifier and timing information are received from that wireless communication device over a certain length of time.

An access control method effective for use with multiple communication devices can also be achieved in synchronization with each other without having to install the control station or access point serving as a reference in the wireless network, by installing a management information exchange area to exchange management information between multiple communication devices.

Furthermore, in situations when transmission with a guaranteed quality of service (QoS) is required, wireless communication with a guaranteed QoS can be easily achieved by communicating management information to notify that transmission will be made with a guaranteed QoS as, for example, in reserved transmissions.

Furthermore, by sending the management information of a communication device to notify of the presence or absence of the other communication devices capable of communicating with that communication device, the structural area for a wireless network centering on that communication device can clearly be shown.

The transmitting source wireless communication device, along with sending an RTS (Request to Send) by utilizing the receive window described in the management information of the receiving destination wireless communication, may start sending information by setting a connection in response to receiving a CTS (Clear to Send) from the corresponding receiving destination wireless communication device.

Therefore, according to the wireless communication system or wireless communication control method in the first aspect of the present invention, communication devices can perform asynchronous wireless communication by RTS/CTS access control, without having to be in constant receive standby for detecting RTS signals.

Each wireless communication device also performs the minimum required receive operation by respectively setting a minimum required receive window while mutually exchanging the management information. Unlike the related art, there is therefore no need to be in constant receive standby, so operation with low power consumption is achieved. Since the receive window need only detect if there is information addressed to its own communication device, an extremely short receive window can be set so that operation with exceptionally low power consumption is achieved.

Furthermore, the receive operation can be simplified by setting the respective receive windows as needed, since there is no need to receive and decode all information flowing on the transmission lines even during super high speed wireless transmissions.

Information addressed to one's own communication device can be acquired without having to utilize a high-speed processor for receiving information sent in a super high speed transmission.

Here, in response to sending an RTS to the receiving destination wireless communication device, the transmitting source wireless communication device may receive a CTS from the receiving destination wireless communication device by setting a confirmation receive window for receiving the CTS and then utilizing the confirmation receive window. Alternatively, the wireless communication device that received an RTS may return a CTS by utilizing the receive window described in the management information of the transmitting source wireless communication device.

Furthermore, the receiving destination wireless communication device, in response to returning the CTS to the transmitting source wireless communication device, may set an information receive window for receiving information from the transmitting source wireless communication device, and the transmitting source wireless communication device may send information by utilizing the information receive window. Alternatively, the transmitting source wireless communication device, in response to receiving the CTS sent from the receiving destination wireless communication device, may send information by utilizing the receive window described in the management information of the receiving destination wireless communication device.

Furthermore, after the information transmission is complete, a receipt confirmation may be exchanged between the wireless communication devices on the transmitting and receiving sides. In this case, the transmitting source wireless communication device, after sending the information, may set a receipt confirmation receive window for receiving a receipt confirmation from the receiving destination wireless communication device, and the receiving destination wireless communication device may also send a receipt confirmation by utilizing the receipt confirmation receive window. Alternatively, the receiving destination wireless communication device, after receiving the information sent from the transmitting source wireless communication device, may send the receipt confirmation by utilizing the receive window described in the management information of the transmitting source wireless communication device.

A second aspect of the present invention provides a wireless communication device for asynchronous information transmission over a wireless network, comprising: a receiving means for receiving information, a management information storage means for linking management information received from other wireless communication devices to the corresponding wireless communication device and storing the management information, a transmitting means for transmitting information; and an access control means for controlling the transmit and receive timing of the receiving means and transmitting means by utilizing the receive processing timing described in the management information of the receiving destination wireless communication.

A third aspect of the present invention provides a wireless communication method for asynchronous information transmission over a wireless network, comprising the steps of: receiving the management information describing the receive processing timing on the corresponding wireless communication device, from other wireless communication devices; storing the received management information while linking it to the corresponding wireless communication device; and sending information by utilizing the receive processing timing described in the management information of the receiving destination wireless communication device.

Here, the management information contains timing information for setting a receive window for the wireless communication device to perform receive processing and also contains cycle information for setting the receive window. The management information may also contain device ID information unique to the corresponding wireless communication device.

According to the wireless communication device in the second aspect of the present invention or a wireless communication method in the third aspect of the present invention, the management information received from other wireless communication devices is linked to the device ID information and stored so that the timing for multiple wireless communication devices to perform receive processing or in other words, the timing for sending information to each wireless communication device can be determined as desired.

According to the second and third aspects of the present invention, wireless communication devices can perform wireless communication without obtaining a means to check in advance on transmission line usages, by transmitting information based on the management information received in the past, so that information transmission is performed in a comparatively short time.

Specifically, according to the second and third aspects of the present invention, an excellent access control method capable of avoiding collision during asynchronous wireless communication can be implemented without using a random access control method for controlling collision avoidance by carrier sensing.

Furthermore, each wireless communication device may transmit its own management information at each specific cycle, and management information may also contain notification cycle information for transmitting the management information to other wireless communication devices. In the wireless communication device in the second aspect of the present invention or the wireless communication method in the third aspect of the present invention, each wireless communication device may check in response to receiving the management information, whether the corresponding wireless communication device is present in the wireless network, and may also decide that the wireless communication device is no longer present in the wireless network when a specified time (for example, a notification cycle specified in the management information) has elapsed after last receiving the management information.

Specifically, a wireless network system for configuring an autonomous wireless network can be achieved within the communication range of a wireless communication device without having to strictly define the wireless network, by providing a function to decide there is no longer a connection with a wireless communication device and delete it from the memory when no signals containing the identifier and timing information are received from that wireless communication device over a certain length of time.

Furthermore, wireless communication with a guaranteed QoS can be easily implemented for a wireless communication device that gives advance notification that transmission of management information with a guaranteed QoS is required as, for example, in reserved transmissions, by referring to its management information at the time of transmitting the information.

In the wireless communication device in the second aspect of the present invention or in the wireless communication method relating to the third aspect of the present invention, the transmitting source wireless communication device, along with sending an RTS by utilizing the receive window described in the management information of the receiving destination wireless communication, may start transmitting information by setting a connection in response to receiving a CTS from the corresponding receiving destination wireless communication device.

Therefore, the receiving destination wireless communication device can perform asynchronous wireless communication by RTS/CTS access control without being in constant receive standby for detecting RTS signals.

Here, in response to sending an RTS to the receiving destination wireless communication device, the transmitting source wireless communication device may receive a CTS from the receiving destination wireless communication device by setting a confirmation receive window for receiving the CTS and then utilizing the confirmation receive window.

Furthermore, the transmitting source wireless communication device may send information by utilizing the information receive window established by the receiving destination wireless communication device after returning a CTS. Alternatively, in response to receiving the CTS sent from the receiving destination wireless communication device, the transmitting source wireless communication device may send information by utilizing the receive window described in the management information of the corresponding receiving destination wireless communication device.

Furthermore, after the information transmission is complete, a receipt confirmation may be exchanged between the wireless communication devices on the transmitting and receiving sides. In this case, after sending the information, the transmitting source wireless communication device may send a receipt confirmation by setting a receipt confirmation receive window for receiving a receipt confirmation from the receiving destination wireless communication device.

Furthermore, a fourth aspect of the present invention is a wireless communication device for asynchronous information transmission over a wireless network, comprising: a management information creation means for creating management information describing the receive processing timing of one's own device; a receiving means for receiving information; a transmitting means for transmitting the management information; and an access control means for controlling the receive timing of the receiving means based on the management information, and also controlling the transmit timing of the transmitting means to transmit the management information.

Furthermore, a fifth aspect of the present invention is a wireless communication device for asynchronous information transmission over a wireless network and comprising the steps of: creating management information describing the receive processing timing of one's own device; sending the management information to other wireless communication devices; and receiving information by utilizing the receive processing timing described in the management information.

Here, the management information contains timing information for setting a receive window for the wireless communication device to perform receive processing and also contains cycle information for setting the receive window. The management information may also contain device ID information unique to the corresponding wireless communication device.

Other wireless communication devices receiving this management information, link the management information to the device ID information and store it in the memory so that the corresponding wireless communication device can control the timing to perform receive processing.

Therefore, according to the wireless communication device in the fourth aspect of the present invention or the wireless communication method in the fifth aspect of the present invention, each wireless communication device checks for the presence of the other devices by exchanging the management information, and performs asynchronous transmission based on the receive timing described in the management information, so that a wireless network can be formed. In this case, each wireless communication device can communicate directly and asynchronously with each other without installing a particular device serving as the control station.

Furthermore, the other wireless communication devices can send information by utilizing the receive window described in the management information that was received in advance. Wireless communication devices can therefore perform asynchronous communication without being in constant receiving standby, so that the receive function operates with low power consumption.

Furthermore, the other wireless communication devices can perform wireless communication without obtaining a means to check in advance on transmission line usages, by transmitting information based on the management information received in the past, so that information transmission is performed in a comparatively short time.

Specifically, according to the wireless communication device in the fourth aspect of the present invention or the wireless communication method in the fifth aspect of the present invention, an access control method capable of avoiding conflicts during asynchronous wireless communication can be obtained without using a random access control method for controlling communication conflicts by carrier sensing control.

Furthermore, an access control not prone to communication conflicts can be achieved between multiple wireless communication devices, by arranging the receive window while shifting the timing so that the periods for performing receive processing on each wireless communication device do not overlap with periods of other communication devices.

Furthermore, each wireless communication device may send its own management information at each specified cycle, and management information may also contain notification cycle information for sending the management information to other wireless communication devices.

The other wireless communication devices that received the management information can furthermore check on the presence of the corresponding wireless communication device in the wireless network, and further may decide that the wireless communication device is no longer present in the wireless network when a specified time (for example, a notification cycle specified in the management information) has elapsed after last receiving the management information.

Specifically, a wireless network system for configuring an autonomous wireless network can be achieved within the communication range of a wireless communication device without having to strictly define the wireless network, by providing a function to decide there is no longer a connection with a wireless communication device and delete it from the memory when no signals containing the identifier and timing information are received from that wireless communication device over a certain length of time.

An access control method effective for use with multiple communication devices can also be achieved without having to install the control station or access point that serves as a reference in the wireless network, by installing a management information exchange area in synchronization to exchange the management information between multiple communication devices.

In situations when transmission with a guaranteed quality of service (QoS) is required, wireless communication with a guaranteed QoS can be easily achieved by sending management information to notify that transmission will be made with a guaranteed QoS as, for example, in reserved transmissions.

By sending the management information of a communication device to notify of the presence or absence of the other communication devices capable of communicating with that communication device, the structural range for a wireless network centering on that communication device can clearly be shown.

In the wireless communication device in the fourth aspect of the present invention or wireless communication method in the fifth aspect of the present invention, a wireless communication devices may receive an RTS from other wireless communication devices based on the receive window described in the management information, and also may return a CTS to the transmitting source wireless communication device in response to receiving the RTS. As a result, a connection with the corresponding wireless communication device is established to start transmitting information.

Accordingly, asynchronous wireless communication can be performed by RTS/CTS access control, without having to be in constant receive standby for detecting RTS signals.

Each wireless communication device also performs the minimum required receive operation by respectively setting a minimum required receive window while mutually exchanging the management information. Unlike the related art, there is therefore no need to be in constant receive standby thereby allowing low power consumption operation. Since the receive window need only detect if there is information addressed to its own communication device, an extremely short receive window can be set so that operation with exceptionally low power consumption is achieved.

Furthermore, the receive operation can be simplified by setting the respective receive windows as needed, since there is no need to receive and decode all information flowing on the transmission lines even during super high speed wireless transmissions.

Information addressed to one's own communication device can be acquired without having to utilize a high speed processor for receiving information sent in a super high speed transmission.

Here, the wireless communication device, in response to returning a CTS to the transmitting source wireless communication device, may set an information receive window for receiving the information from the transmitting source wireless communication device.

After receiving the information sent from the transmitting source, the wireless communication device may send a receipt confirmation.

Furthermore, a sixth aspect of the present invention is a computer program written in a computer-readable format for performing wireless communication processing on a computer system to send information over a wireless network for asynchronous information transmission and comprising the steps of: receiving management information from other wireless communication devices, describing the receive processing timing of the corresponding wireless communication device; storing the received management information while linking the received management information to the corresponding wireless communication device; and sending information by utilizing the receive processing timing described in the management information of the receiving destination wireless communication device.

Furthermore, a seventh aspect of the present invention is a computer program written in a computer-readable format for performing wireless communication processing on a computer system to send information over a wireless network for asynchronous information transmission and comprising the steps of: creating management information describing the receive processing timing of one's own device; sending the management information to other wireless communication devices; and receiving information by utilizing the receive processing timing described in the management information.

The computer programs of the sixth and seventh aspects of the present invention are defined as computer programs written in a computer-readable format to achieve specified processing in a computer system. In other words, interactive effects are achieved by installing computer program of the sixth and seventh aspects of the present invention, and the same effects as in the wireless communication method of the third and fifth aspects of the present invention can be obtained.

Further objects, characteristics and advantages of the present invention will become apparent from the embodiments of the present invention described while referring to the following drawings.

BRIEF DESCRIPTION OF THE DRAWINGS

FIG. 10 is a schematic drawing showing the configuration of the asynchronous wireless communication network in the second embodiment of the present invention;

FIG. 13 is a schematic drawing showing the configuration of management information P;

FIG. 14 is a schematic drawing showing the configuration of an RTS (Request to Send);

FIG. 15 is a schematic drawing showing the configuration of a CTS (Clear to Send);

FIG. 16 is a schematic drawing showing the configuration of transmission information S;

FIG. 17 is a schematic drawing showing the configuration of receipt confirmation T;

DETAILED DESCRIPTION

Best Mode for Carrying Out the Invention

The embodiments of the present invention are hereafter described in detail with reference to the drawings.

First Embodiment

Figure 1:
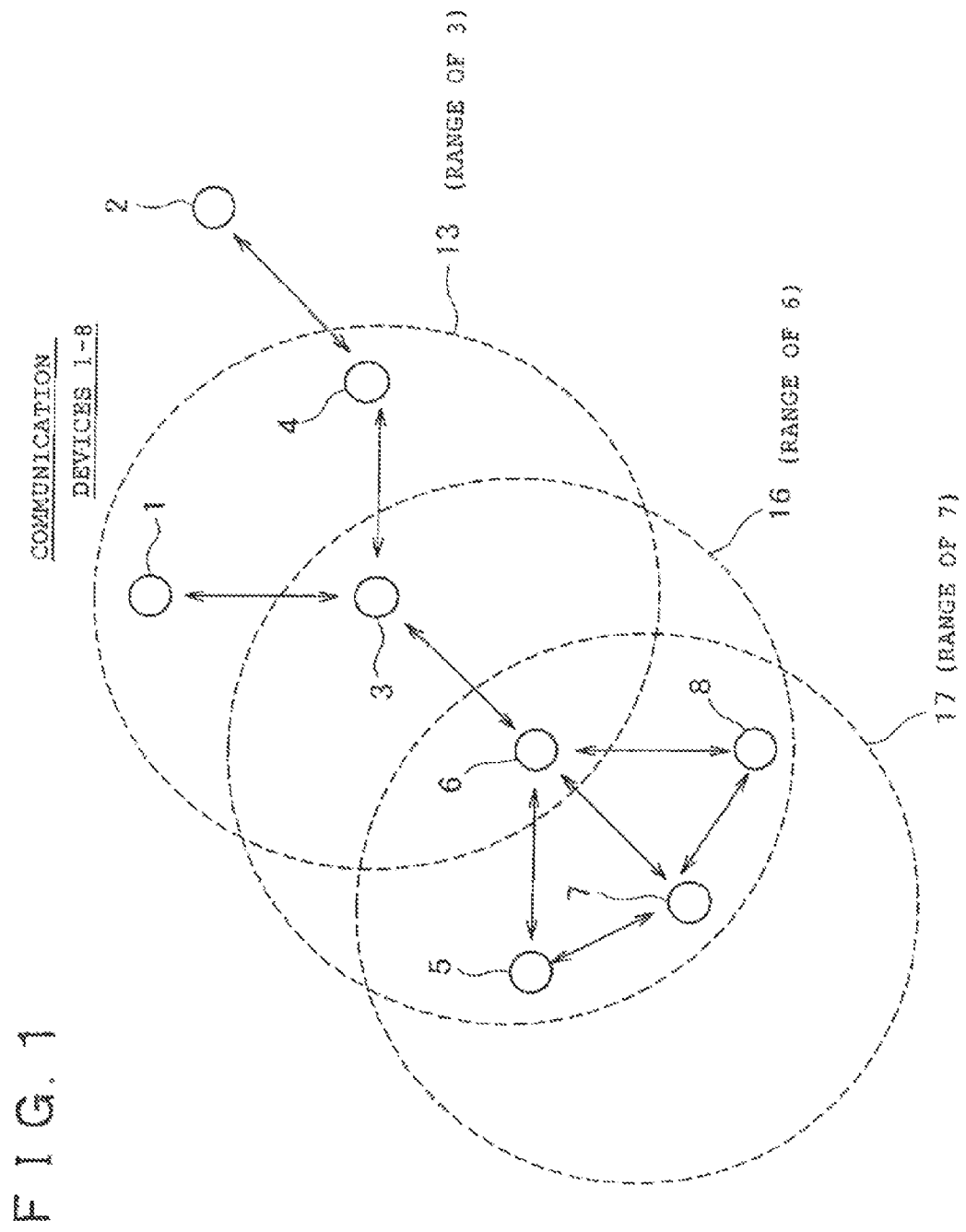
FIG. 1 is a schematic drawing showing the configuration of an asynchronous wireless communication network in the first embodiment of the present invention.

The wireless network of the first embodiment of the present invention is schematically shown in FIG. 1. Each communication device within the wireless network of the present embodiment is capable of sending information asynchronously. Of course synchronous information transmission is also applicable to the present invention.

In the example in the drawing, the communication device 1 through communication device 8 are distributed spatially. The arrows in the drawing show that each communication device can communicate with other adjacent communication devices. A communication device 3 is capable of direct communication with each of communication devices 1, 4 and 6 which are present within the communication range 13 shown by the dashed line.

A communication device 6 is capable of direct communication with each of communication devices 3, 5 and 7 which are present within the communication range 16 shown by the dashed line.

A communication device 7 is capable of direct communication with each of communication devices 5, 6 and 8 which are present within the communication range 17 shown by the dashed line.

The communication device may, for example, be comprised of a communication adapter card or PC card, or computer peripheral equipment of other configurations. The communication device may be mounted within external connection equipment (not shown in drawing) such as a personal computer or PDA (Personal Digital Assistant) to provide wireless transmission capability.

Each communication device in the present embodiment can set notification cycles for management information at specified time intervals and transmit (or for example, broadcast) management information describing information on periods when receive is allowed, such as receive timing information showing the position to start receiving information on one's own communication device, receive window information, and receive window cycle information. The other communication devices that received the management information, however, link it with the receive number of the corresponding communication device and store the respective receive timing and receive windows and receive cycle.

Communication devices within the wireless network can check for the presence of other communication devices within the network by receiving their management information. In other words, each communication device can inform other communication devices of its own presence in the wireless network by transmitting (broadcasting) management information at specified notification cycles. Moreover, if there are communication devices whose notification cycle (time) elapsed (or another specified time elapsed) without management information being received, then it is possible to assume that those communication devices are no longer within the wireless network. Accordingly, an autonomous wireless network is formed by communication devices spatially present within the network and capable of exchanging management information.

When communication terminals send information to each other within this type of wireless network, the transmitting communication device finds the receive start position of the communication device that will receive the information, based on the receive timing, receive windows and receive cycle described in the management information that were already stored, and send information on its timing. However, access control in an asynchronous wireless network of the present embodiment is mentioned in detail later on.

Figure 2:
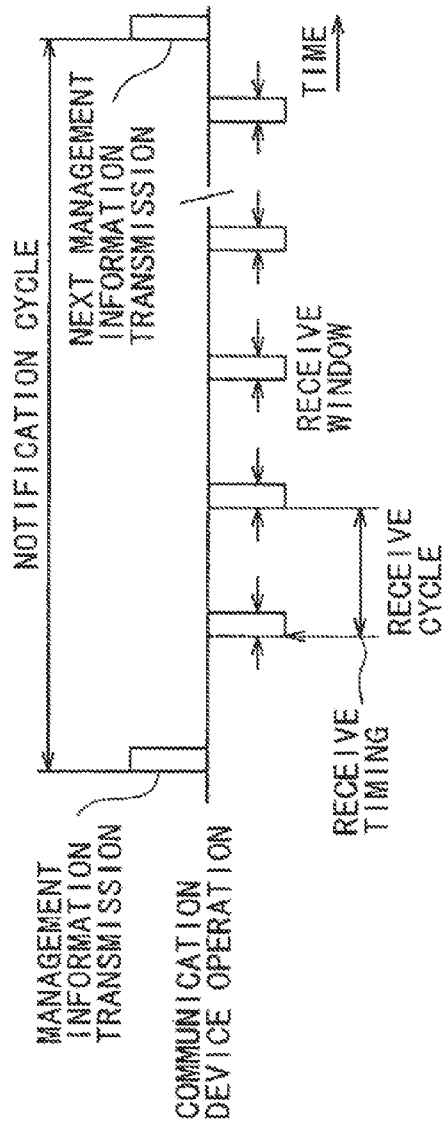
FIG. 2 is a drawing showing an example of setting the receive timing for communication devices operable on a wireless network in the first embodiment of the present invention.

FIG. 2 shows an example of receive timing setting by a communication device capable of operating on the wireless network of the present embodiment.

As shown in the drawing, the cycle for repetitively sending the management information is set as the notification cycle. The notification cycle is equivalent to the time interval placed before sending the next management information. For example, one cycle is set to an interval from several dozen milliseconds to several minutes. As described above, by sending (broadcasting) the management information at each specified notification cycle, a communication device can notify other communication devices within the wireless network of its own presence.

A "receive window" is set as the time for receiving the information. For example, the receive window is set as the minimum required time for returning a communication request and its confirmation. This receive window is set for receiving the signal in an extremely small amount of time. The receiving section in the communication device decides if decoded information is present within the receive window or not. If decided that information is present, then a setting can be made so the next information is continually received even after the receive window was closed.

A receive window is arranged along the time axis to set the "receive timing" used to start receive operation at a certain timing, so that the actual receive timing is designated.

A "receive cycle" or a "receive window cycle" is set for indicating where the next window will be provided, and receive processing is then performed based on the receive cycle.

The receive window cycle can be set to any desired cycle according to the communication device operating condition. This means that a long receive window cycle can be set when asynchronous communication has not been performed over a long time, or a short receive window cycle can be set for implementing asynchronous communication without stress.

The receive window and the receive window cycle can be set to avoid conflicts between communication devices within the wireless network and in this way make efficient use of wireless transmission lines.

The example in FIG. 2 shows separate settings for each parameter; however, these may be set as fixed parameters.

Figure 3:
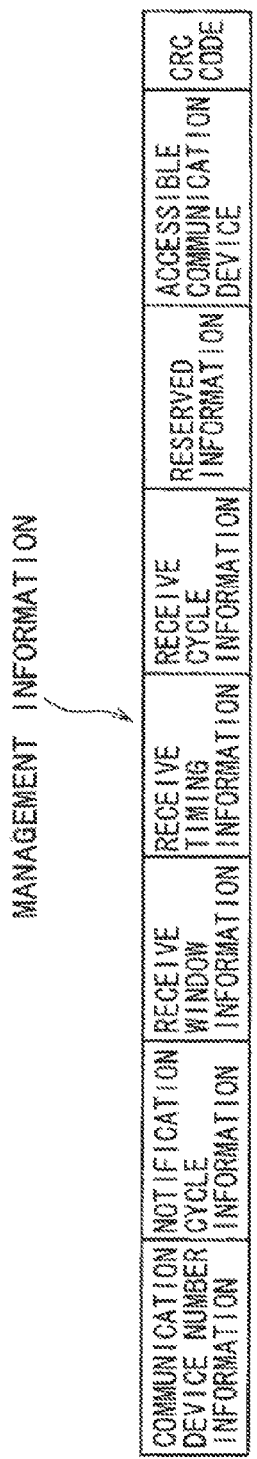
FIG. 3 is a drawing showing typical management information transmitted from a communication device at a specific notification cycle in the first embodiment of the present invention.

FIG. 3 is an example of the management information structure for the communication device for sending management information at each specified notification cycle in the present embodiment. Information needed for configuring a wireless network for asynchronous communication is described in the management information.

As shown in the figure, the management information provides fields in which various types of information are written, including: communication device number information on an individual ID number assigned to a communication device for transmitting that management information; notification cycle information for showing the cycle for performing management information notification; receive window information for showing the time for performing receive processing; receive timing information for notifying what time was set in that receive window; and receive cycle information for designating the position where the receive window is periodically installed.

Besides the above basic structure, the management information may contain other items as needed, including reserved information for notification of reserved transmission areas; information on other communication devices for designating accessible communication devices in the vicinity; an CRC (Cyclic Redundancy Check) code for identifying if the management information is correct or not, etc.

For example, when transmission with a guaranteed communication quality (QoS: Quality of Service) is required, then the communication device can place information for transmission with a guaranteed QoS in the management information and send (broadcast) it. For example, by writing a reserved transmission area setting into the reserved information field within the management information, the data transmission can then be made to the corresponding communication device utilizing a reserved bandwidth and the QoS guaranteed.

By describing information about other accessible communication devices into the management information, the other devices that received the management information can recognize the wireless communication environment of the corresponding communication device, that is, the structure of the asynchronous wireless network configured by the corresponding communication device that sends (broadcasts) its management information at the specified notification cycle.

These specifications describe an example of setting the management information as individual parameters. However, parameters that are not needed can be deleted as necessary. Further, if there are parameters that must be added as management information, then these may be added as needed.

As mentioned above, in the asynchronous wireless network of the present embodiment, each communication device can notify other communication devices of its presence in the wireless network by transmitting (broadcasting) management information as shown in FIG. 3 at each specified notification cycle. By broadcasting the management information in notification cycles at a rate of once in a few to once in a few thousand times, the frequency that transmissions are sent can be kept low and power consumption can be reduced.

To send information, the communication device for sending it must use a receive window specified in the management information of the communication device that will receive the information. Using the specified receive window drastically shortens the information receive processing in the communication device set with the receive window and receive window cycle. Use of the specified receive window also allows the transmitting communication device to finish sending the information at the specified timing, and also reduces the processing load for acquiring synchronization.

By making the receive window and receive window cycle settings so that no communication conflicts occurs among the communication devices in the wireless network, the wireless transmission lines can be efficiently utilized.

When a communication device sends management information as shown in FIG. 3 and detects the presence or absence of other accessible communication devices, then each communication device can clearly show the range of the wireless network structure centering around itself.

Figure 4:
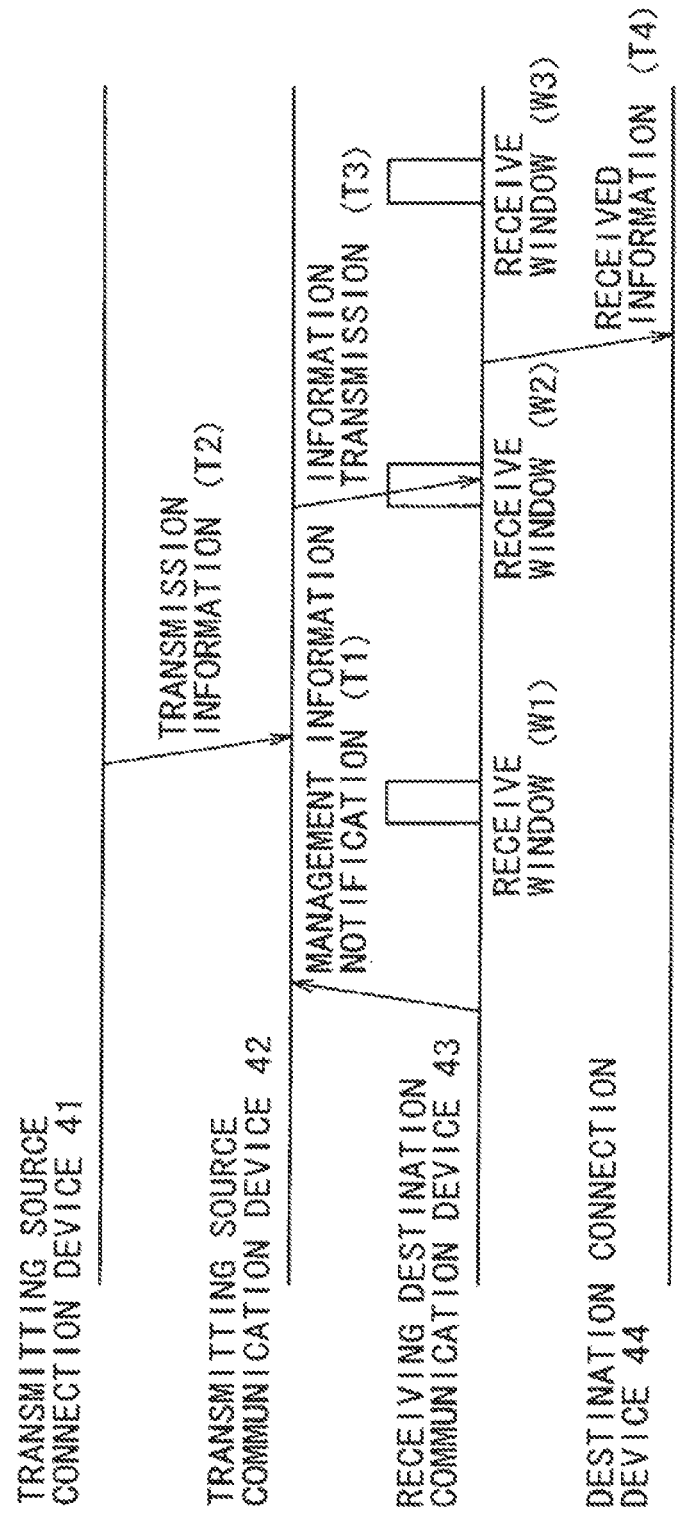
FIG. 4 is a drawing showing a sequence example of information transmission between communication devices in the first embodiment of the present invention.

FIG. 4 shows an example of the information transmission sequence performed by the communication device of the present embodiment. The example in the drawing shows the sequence for information exchange among the source connection device 41 serving as the source for transmitting the asynchronous information, the transmitting source communication device 42 serving as the source for transmitting the wireless communication, the receiving destination communication device 43 serving as the destination for receiving the wireless communication, and the destination connection device 44 serving as the destination for receiving the asynchronous information.

First of all, the management information is notified (T1) to the transmitting source communication device 42 from the receiving destination communication device 43. The transmitting source communication device 42 can therefore detect that the receiving destination communication device 43 is within its own communication range. The transmitting source communication device 42 may also notify its management information (not shown in drawing) to the receiving destination communication device 43 so that the receive window (not shown in drawing) of the transmitting source communication device 42 may be set on the receiving destination communication device 43.

The time for receiving the information or, in other words, the receive window, is set in the receiving destination communication device 43. Information relating to the receive window such as the receive window, receive timing, and receive window cycle is also contained in the management information notified from the receiving destination communication device 43, so the transmitting source communication device 42 that received the information beforehand can know that the timings for receive windows W1 through W3.

Here, when the transmission information has arrived (T2) at the transmitting source communication device 42 from the source connection device 41, the transmitting source communication device 42 utilizes the timing for the receive window W2 which is the nearest in the vicinity from among receive window timings on the receiving destination communication device 43 and transmits the information (T3).

The receiving destination communication device 43 at this time carries out receive operation in the period of the receive window W2, so the information transmission can be received.

The receive window basically is set to receive the signal in an extremely short time. However, a decision is made whether there is decoded information in the receive window or not.

When decided that information is present, then the subsequent receive processing may continue (not shown in drawing) even after the receive window has elapsed.

When the information transmission 403 was received correctly, the receiving destination communication device 43 conveys the received information (T4) to the destination connection device 44.

The receiving destination communication device 43 in this way receives information according to a receive window and receive window cycle that were set beforehand. Therefore, compared to the related art which must always be in standby for receiving information, the receive processing time can be drastically shortened and the power consumption reduced. The processing on the transmitting source communication device 42 can also end just by transmitting the information the specified timing.

In the asynchronous wireless network of the present embodiment, each communication device can notify other communication devices of its presence in the wireless network by transmitting management information containing receive timing information showing its own information receive start position, receive window information and receive cycle information at a specific cycle. Each communication device sets notification periods at specified time periods to transmit management information. However, when multiple communication devices set their own respective timings, it is preferable that the receive windows and receive window periods be arranged so they do not mutually conflict.

Figure 5:
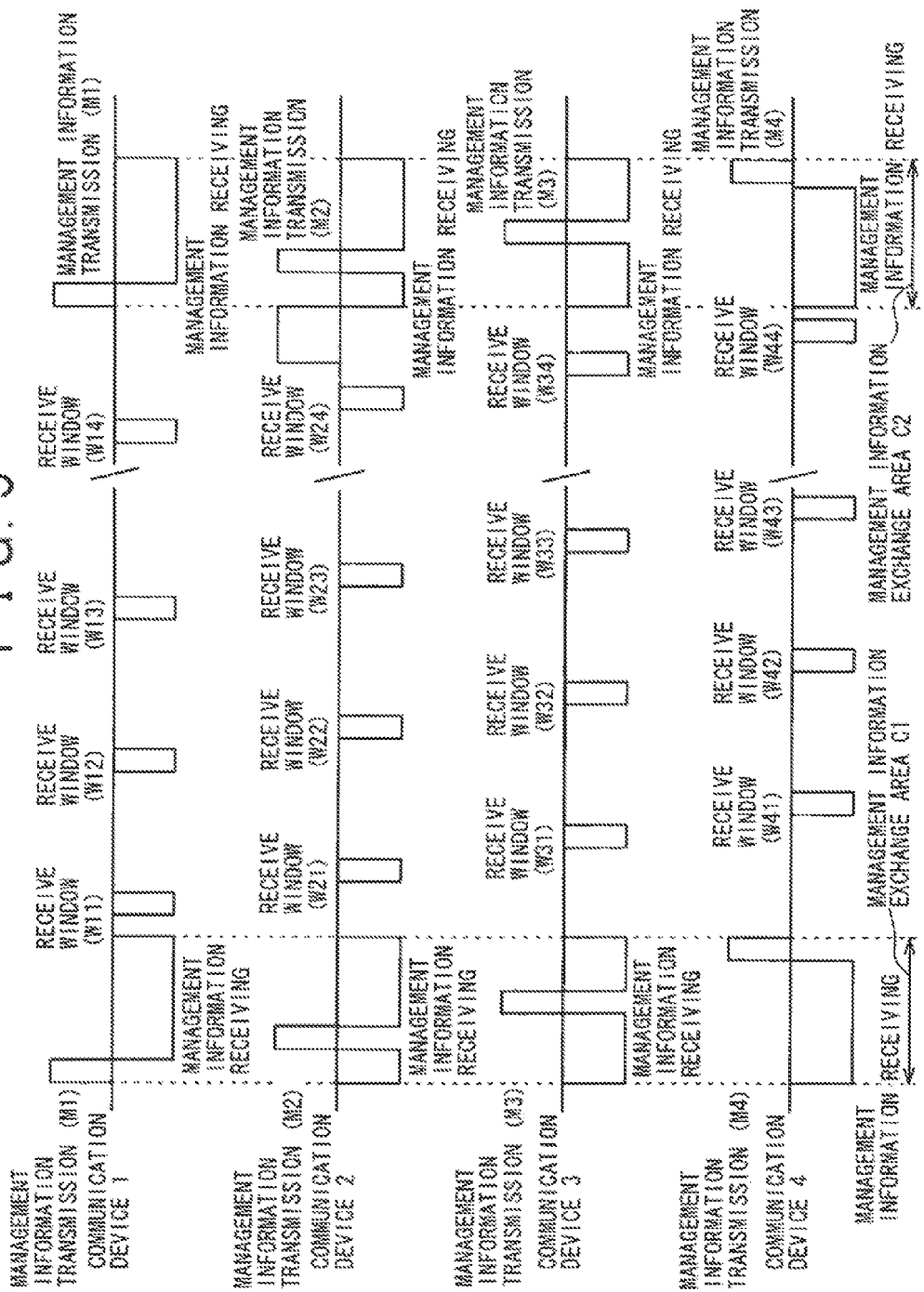
FIG. 5 is a schematic drawing showing an example of arranging receive windows distributed to the communication devices.

FIG. 5 is a schematic drawing showing an example of arranging the receive windows dispersed for each communication device so that the receive window and receive window cycle do not conflict with each other when multiple communication devices are present in the vicinity.

Here, the communication device 1 serving as a basis notifies other communication devices of its own existence within the wireless network by transmitting management information M1. The communication device 1 also established its own receive windows W11 through W14 for receiving information based on the receive timing and receive window cycle specified by this management information M1.

In the present embodiment, the communication device 1 that first sends management information in the asynchronous wireless network sets the management information exchange area C1, so that operation proceed along with other communication devices present in the vicinity. This management information exchange area C1 is established at each specified notification cycle, and the next management information exchange area C2 is established right after the management information M1 is sent the next time. Then, management information from other communication devices is received utilizing the period in the management information exchange area C1 during which its own management information is not being sent.

The communication device 2 sends its own management information M2 when the management information M1 of the communication device 1 has been received. The communication device 2 notifies other communication devices in the wireless network of its own presence. The communication device 2 establishes receive windows W21 through W24 for receiving information based on the receive timing and receive window cycles specified by this management information M2.

In the example shown in FIG. 5, the communication device 2 sets the timing for transmitting its own management information based on the position of the management information exchange area C1 set by the communication device 1 so that no conflicts occur with the management information notification timing of the communication device 1. The communication device 2 then receives management information from the other communication devices by utilizing the period in the management information exchange area C1 during which its own management information is not being transmitted. The receive windows W21 through W24 are also established so no conflicts occur with the receive windows of the communication device 1.

Likewise, the communication device 3 sends its own management information M3, notifying other communication devices in the wireless network of its own presence. The communication device 3 also establishes receive windows W31 through W34 based on the receive timing and receive window cycles specified by this management information M3.

In the example shown in FIG. 5, the communication device 3 sets the timing for transmitting its own management information based on the position of the management information exchange area C1 set by the communication device 1 so that no conflicts occur with the management information notification timing of the communication device 1 and communication device 2. The communication device 2 then receives management information from the other communication devices by utilizing the period in the management information exchange area C1 during which its own management information is not being transmitted. The receive windows W31 through W34 are also established so no conflicts occur with the receive windows of the communication device 1 and communication device 2.

The communication device 4 in the same way, sends its own management information M4, notifying other communication devices in the wireless network of its own presence. The communication device 4 also establishes receive windows W41 through W44 based on the receive timing and receive window cycles specified by this management information M4.

In the example shown in FIG. 5, the communication device 4 sets its own management information transmit timing based on the management information exchange area C1 set by the communication device 1, so as not to conflict with the management information notification timing of the communication device 1, communication device 2, and communication device 3. The communication device 4 then receives management information from the other communication devices by utilizing the period in management information exchange area C1 during which its own management information is not being transmitted. The receive windows W41 through W44 are also established so no conflicts occur with the receive windows of the communication device 1, communication device 2 and communication device 3.

Figure 6:
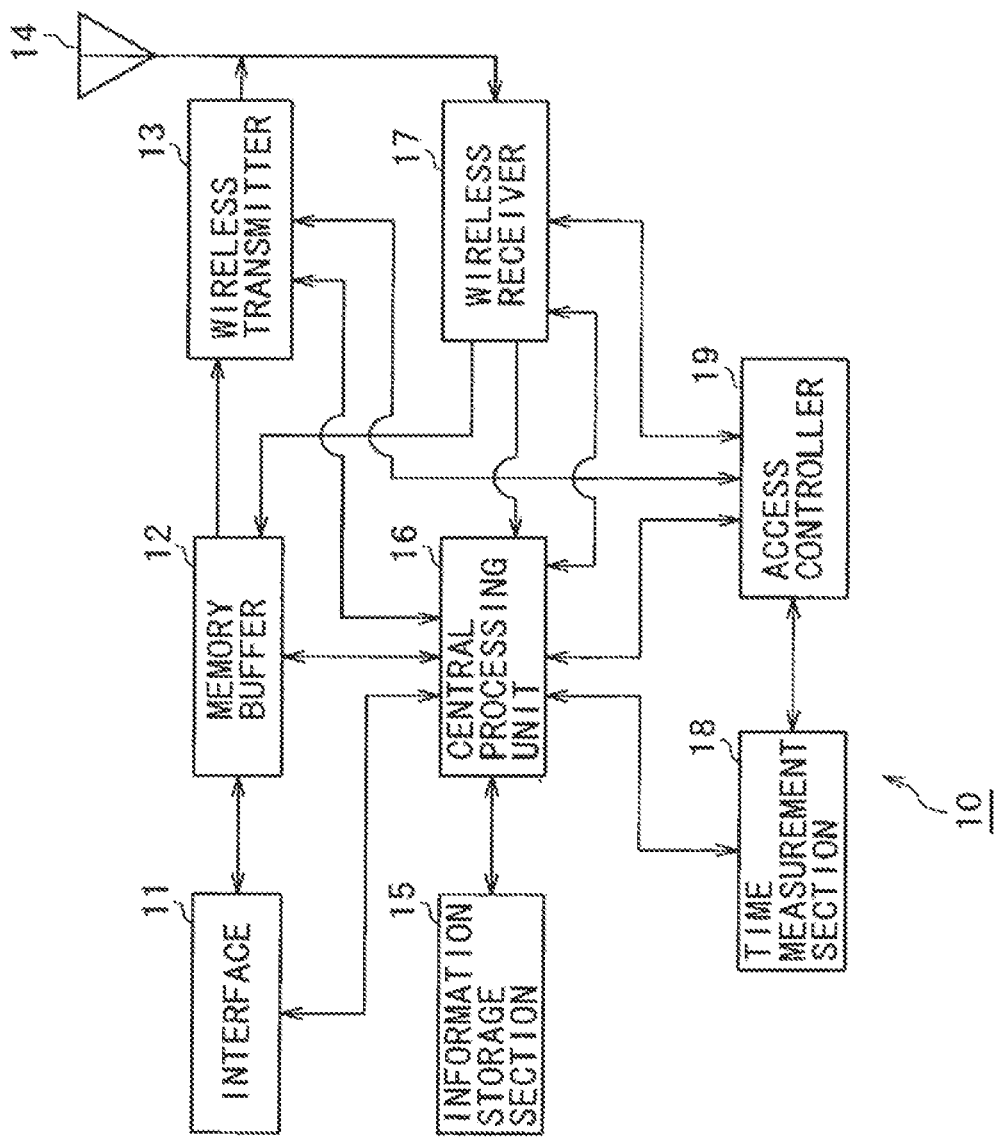
FIG. 6 is a block diagram showing the functions of communication device 10 operating on an asynchronous wireless network in the first embodiment of the present invention.

FIG. 6 is a block diagram showing the functions of the communication device 10 in the asynchronous wireless network of the present embodiment. As shown in the figure, the communication device 10 is comprised of an interface 11, a memory buffer 12, a wireless transmitter 13, an antenna 14, an information storage section 15, a central processing unit 16, a wireless receiver 17, a time measurement section 18, and an access controller 19. However, other structures may also be used to achieve the same functions as the structure in the drawing so the invention is not limited to this structure.

The communication device 10 can also communicate asynchronously with other wireless communication devices under the overall control of the central processing unit 16. The central processing unit 16 is a microprocessor and controls the equipment operation during asynchronous wireless communication by implementing operating sequence commands (program codes) stored in the information storage section 15.

The parameters required for access control in asynchronous wireless communication in the present embodiment are generated in the central processing unit 16, stored in the memory buffer 12 as the management information and those parameters are also stored in the access controller 19.

The management information is comprised of communication device number information on an individual identification number assigned to the communication device 10; notification cycle information for reporting the management information; receive window information for showing the time for performing receive processing; receive timing information for notifying what time was set in that receive window; and receive cycle information for designating the position where the receive window is periodically installed (see FIG. 3).

The access controller 19 regulates the information transmitting and information receiving operations of the communication device 10 in the wireless network based on time information from the management information time and the measurement section 18. First of all, the access controller 19 issues instructions to the wireless transmitter 13 when the transmit timing has arrived. This transmit timing referred to here is the receive window installed in the communication device at the receiving destination. In response to the instruction from the access controller 19, the wireless transmitter 13 then sends the transmission information stored in the buffer memory 12 from the antenna 14 as a wireless signal, The access controller 19 issues instructions to the wireless receiver 17 when the receive timing has arrived, based on the management information and the time information from the time measurement section 18. The wireless receiver 17 then receives the wireless signal that was captured via the antenna 14.

When the wireless receiver 17 has received the management information from the other communication devices in the management information exchange area, it supplies that management information to the central processing unit 16. The central processing unit 16 then appropriately stores each parameters described in the management information, into the information storage section 15. This management information is then utilized when transmitting information to that transmitting source communication device.

When the information received by the wireless receiver 17 is transmission information addressed to the wireless communication device 10 itself, that information is stored in the memory buffer 12. In the memory buffer 12, that receive information is reconstructed and supplied to the connected interface 11 (not shown in drawing). If the received information is any other information then it is discarded.

If there is any information supplied from a connected device (not shown in drawing), then the interface 11 stores that transmission information in the memory buffer 12 and also notifies the central processor unit 16 of the information on the destination for wireless transmission. The central processor unit 16 then refers to other parameters received from other communication devices in the past that are stored in the information storage section 15 and sends instructions to the access controller 19 to process the transmission.

This series of information transmission operations starts up based on instructions from the central processor unit 16, and the access controller 19 then operates according to the timing of the time measurement section 18.

The central processor unit 16 then refers to the notification cycle information in its own management information stored in the information storage section 15 and instructs the access controller 19 to transmit the management information set at the transmit timing for its own management information within the management information change area. In response to this, the access controller 19 then detects the arrival of the transmit timing based on timing information from the time measurement section 18 and instructs the wireless transmitter 13 to send the management information at each specified notification cycle. The wireless transmitter 13 then reads out its own management information from the memory buffer 12 and transmits it via the antenna 14.

When transmitting information supplied by way of the interface 11, the central processor 16 temporarily stores the transmission information in the memory buffer 12. The central processor 16 also reads out the management information of the receiving destination communication device from the information storage section 15 in order to acquire receive window information, receive timing information, and receive cycle information (as required), and then issues an instruction for the transmit processing to the access controller 19. In response to this, the access controller 19 detects the arrival of the transmit timing based on timing information from the time measurement section 18 and instructs the wireless transmitter 13 to send the information in accordance with the receive window of the receiving destination communication device. The wireless transmitter 13 then reads out the transmission information from the memory buffer 12 and transmits it via the antenna 14.

The central processor unit 16 then refers to the receive window information, receive timing information, and receive notification information in its own management information stored in the information storage section 15 and instructs the access controller 19 to perform receive processing. The access controller 19 detects the arrival of the receive timing based on timing information from the time measurement section 18 to establish the receive window at each specified receive window cycle and instructs the wireless receiver 17 to receive the information. The wireless receiver 17 then receives the information via the antenna 14 and stores the received information in the memory buffer 12. A decision is made whether there is decoded information in the receive window or not. When decided that the information is present, the receive processing continues even after the receive window has elapsed.

The device connected by way of the interface 11 is an information processing device such as a personal computer or a PDA. This type of information processing device does not basically have wireless communication functions. However, by connecting a communication device as shown in FIG. 6, the data processed in the main unit can be sent by wireless transmission and the transmitted information from other devices can be received.

When transmission with a guaranteed communication quality (QoS: Quality of Service) is required, a reserved transmission area setting can be written into the reserved information field within the management information, so that the communication device can transmit data to the corresponding communication device by utilizing a reserved bandwidth and the QoS guaranteed (see the previous description and FIG. 3). The time management of access control in the asynchronous network of the present embodiment is described below with reference to FIG. 7, in which the management information exchange area and reserved transmission area have been set.

Figure 7:
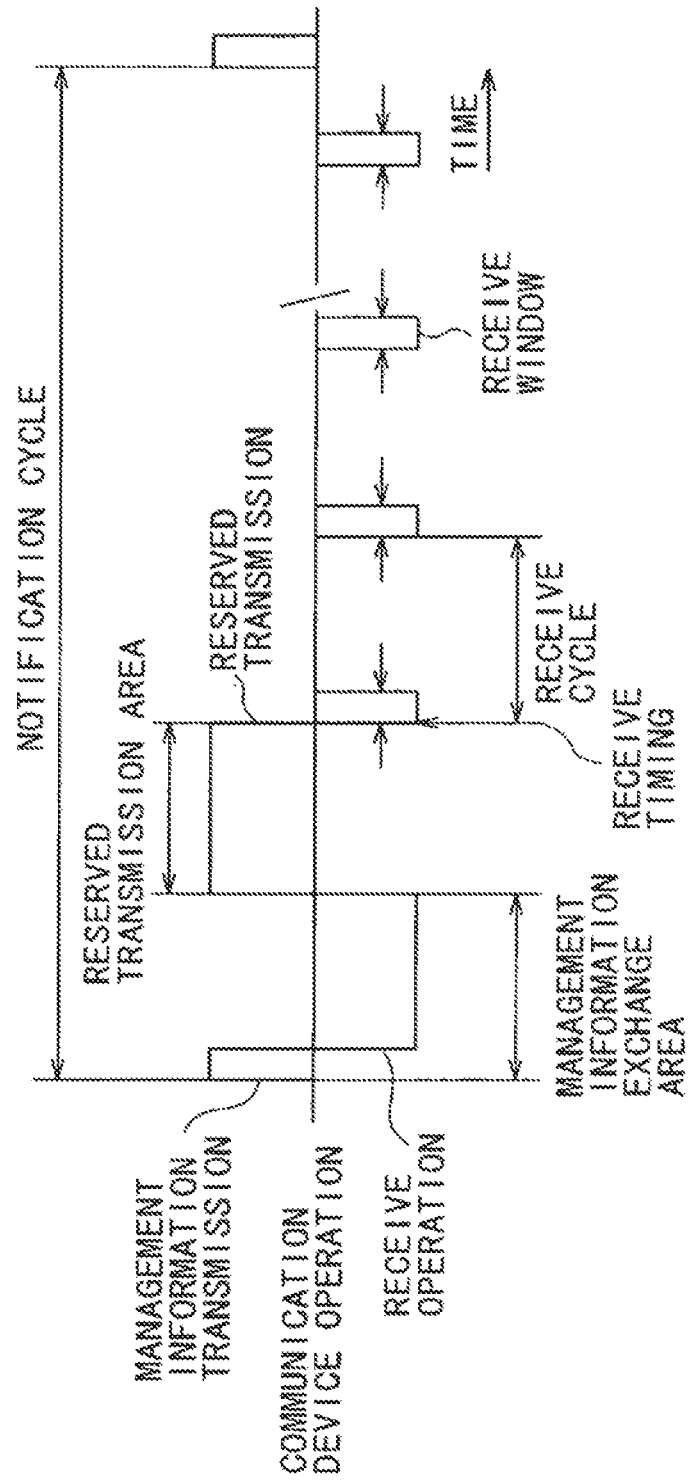
FIG. 7 is a time chart illustrating access control for setting a management information exchange area and a reserved transmission area on an asynchronous wireless network in the first embodiment of the present invention.

The example in FIG. 7 shows the setting of the management information exchange area after a wireless communication device has transmitted the management information. In this case, the communication devices in the vicinity can be notified that management information has been received in the management information exchange area.

When other communication devices in the vicinity detect that the management information exchange area has been set, the management information is transmitted utilizing this management information exchange area. Information can in this way be exchanged with communication devices whose management information exchange area is set and with other communication devices in that vicinity.

When the communication device 10 must transmit information at regular intervals (cycles) from its own device, then a reserved transmission area should be set in advance according to the quantity of data to be transmitted.

By notifying communication devices in the vicinity with management information containing this reserved information, those other communication devices in the vicinity can be informed of periodic information transmission or, in other words, that reserved bandwidth transmission will be made in the asynchronous wireless communication network.

Figure 8:
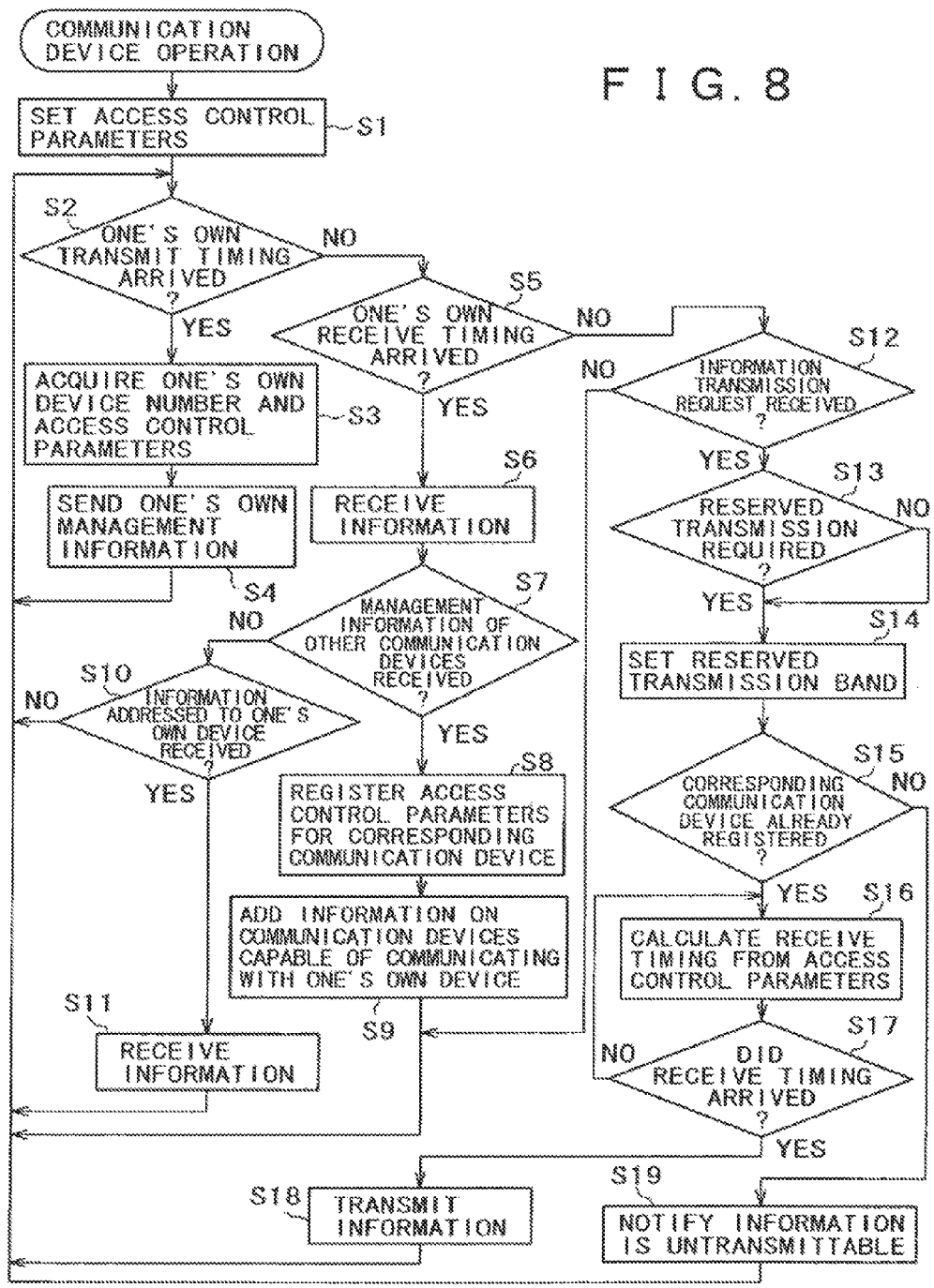
FIG. 8 is a flowchart showing the operating procedure for a communication device capable of communicating directly and asynchronously with other communication devices on a wireless network in the first embodiment of the present invention.

FIG. 8 is a flowchart of the operating procedure of communication device 10 capable of carrying out direct asynchronous communication with other communication devices in the wireless network of the present embodiment. In the actual implementation of this operating sequence, the central processor 16 executes program codes stored in the information storage section 15. The operation for direct asynchronous communication in the wireless network of the present embodiment is described in detail below with reference to this flowchart.

First of all, the wireless communication device 10 sets the access control parameters such as the notification cycle, receive window, receive timing, and receive cycle (step S1). These access control parameters are stored in the information storage section 15.

Next, the wireless communication device 10 decides whether or not its own timing has arrived (step S2). The transmit timing for the management information is determined by the access control parameter settings of step S1. The transmit timing for the management information is set utilizing the management information exchange area so that conflicts do not mutually occur with other communication devices.

When the transmit timing for the management information has arrived, the operation branches from "Yes" of step S2 and proceeds to step S3. In step S3, its own device number and access control parameter are acquired, the management information configured (See FIG. 3), and this information temporarily stored in the memory buffer 12. The wireless transmitter 13 then reads out the management information from the memory buffer 12 and transmits (broadcasts) the management information to the wireless communication devices in the vicinity (step S4). After transmitting the management information, the operation returns to step S2. The communication device 10 in this way notifies other wireless communication devices in the vicinity of its own presence in the wireless network.

On the other hand, if decided in step S2 that the transmit timing for its own management information has not arrived, then in step S5 a decision is again made on whether its own receive timing has arrived. This receive timing is determined as the receive window information, receive timing information, receive window cycle information during setting of the access control parameters in step S1. The transmission lines can be efficiently utilized by setting the receive window and receive window cycle so that communication devices within the wireless network do not conflict with each other.

When the receive timing has arrived with information addressed to its own communication device, then the operation proceeds to step S6 from the "Yes" branch point of step S5 and information receive processing is performed. Likewise, this receive processing is performed even in a management information exchange area that was separately set.

Next, whether or the management information of the other communication devices was received is decided (step S7). If decided that management information of other communication devices was received then that management information is analyzed, and access control parameters of the corresponding communication device are registered (step S8) and added as communication devices capable of communicating with one's own device (step S9). Here, the registration of the access control parameter is equivalent to storing the management information in the information storage section 15. The operation then returns to step S2.

By receiving management information from other communication devices, the communication device 10 is capable of checking their presence in the asynchronous wireless network. In other words, a wireless network is configured by communication devices present within a space where their management information can be mutually exchanged.

On the other hand, when decided that the management information was not received, the operation proceeds to step S10, and a decision further made if information addressed to its own communication device was received. Then, information receive processing is performed only in cases where the information was received, (step S11). After receive processing, the operation returns to step S2.

The communication device 10 performs receive operation (See FIG. 2) in receive windows according to the access parameter control settings of step S1. This receive window is set to receive signals in an extremely short time. A decision is made on whether decoded information is present within the receive window or not. When decided that information is present, then the receive processing may continue to receive the information even after the receive window was closed.

When decided in step S5 that the receive timing has not arrived, a decision is further made in step S12 on whether there is a request for information transmission from an external device (for example, an information terminal such as a personal computer or PDA) connected by way of the interface 11.

Here, when decided that information transmission is required, the type of transmission information is designated, and a decision made whether or not a separate reserved transmission is required (step S13). A reserved transmission area is then set as needed (step S14) only in cases where the reserved transmission is needed. The operation returns to step S2 when no request for information transmission was received.

Next, information on the destination address for the transmission information is acquired, and a decision made whether or not the access control parameters for the corresponding communication device at the destination are already stored in the information storage section 15 (step S15) In other words, a decision is made whether the management information has already been received from the communication device of that destination address.

If the corresponding management information is already registered, then the operation proceeds to step S16 to acquire the access control parameters such as the receive window information, receive timing information, and receive window cycle information and calculates the receive timing at the communication device at the destination address.

Operation is in standby (step 17) until the calculated receive timing (in other words, the nearest window cycle) arrives, and the information is then transmitted (step 18). After transmission, the operation returns to step S2.

When determined in step S15 that no corresponding destination communication device is registered, the operation then shifts from the "No" branch point of the applicable step to step S19. In this step the device connected by way of the interface 11 is notified that information transmission is impossible. The operation then returns to step S2.

As mentioned above, a wireless network can be configured by communication devices present within a space in which their management information can be mutually exchanged. Though not shown in FIG. 8, a processing step may be executed to determine that a communication device is no longer present in the wireless network when its notification cycle has elapsed (or another specified period has elapsed) after last receiving the management information of that communication device. Then, the management information of that communication device whose presence can no longer be confirmed may also be deleted from the information storage section 15.

Figure 9:
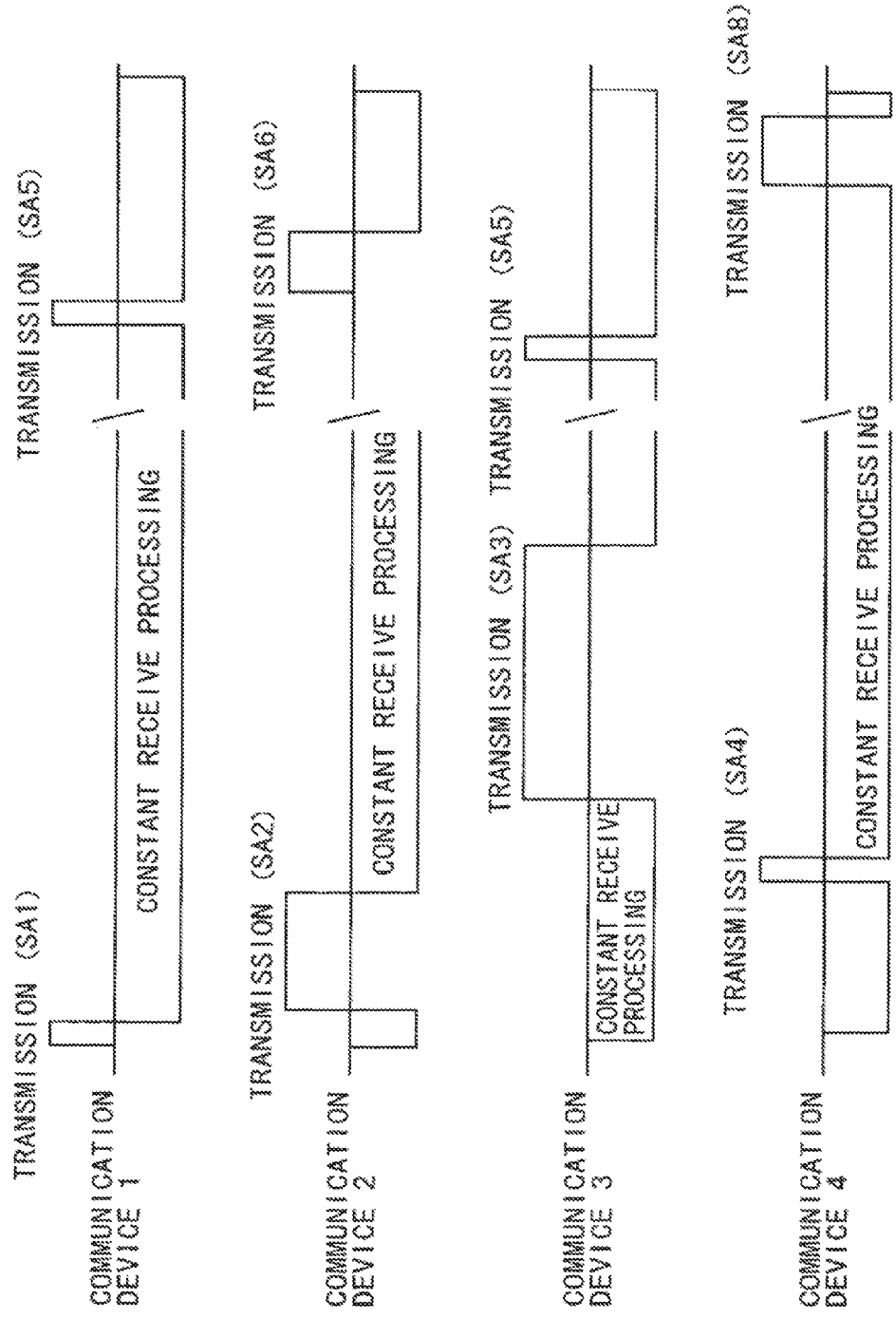
FIG. 9 is a drawing showing an example of asynchronous transmission by communication devices of the related art.

FIG. 9 shows an example of asynchronous wireless transmission by random access control of the carrier sense method using wireless communication devices of the related art, for purposes of comparison with the information transmission operation by wireless communication devices of the present embodiment. In the example in this figure, asynchronous transmission is performed by four devices comprised of communication devices 1 through 4.

The communication device 1 has high power consumption because receive processing is constantly performed in all areas other than information transmit area SA1 and information transmit area SA5 that send information from its own communication device to other communication devices. All information sent from other communication devices must be received and an operation to sort out information addressed to itself is required so a CPU with high processing capacity is needed.

The communication device 2 must also constantly perform receive processing of areas other than information transmit area SA2 and information transmit area SA6 that send information from its own communication device to other communication devices. All information sent from other communication devices must be received, and an operation to sort out information addressed to itself is required.

The communication device 3 must also constantly perform receive processing of areas other than information transmit area SA3 and information transmit area SA7 that send information from its own communication device to other communication devices. All information sent from other communication devices must be received and an operation to sort out information addressed to itself is required.

The communication device 4 must also constantly perform receive processing of areas other than information transmit area SA4 and information transmit area SA8 that send information from its own communication device to other communication devices. All information sent from other communication devices must be received and an operation to sort out information addressed to itself is required.

Here, it should be clearly understood that unless a communication device ascertains the presence of all other communication devices when performing access control such as shown in FIG. 9, there is a very high probability that information transmission from the communication device may overlap with information transmission from another communication device and cause a conflict.

Second Embodiment

FIG. 10 is a schematic drawing showing the configuration of the asynchronous wireless network of the second embodiment.

The example of a wireless network used in this figure has six communication devices 1 through 6. More specifically, the wireless network is comprised of a communication range 13 for a communication device 3. Other communication devices in the vicinity of the communication range of a communication device may also be present and can automatically form a wireless network.

Other communication devices within the communication range 13 can receive management information sent from the communication device 3 and receive information transmitted from other communication devices. This management information is made up of receive timing information containing the information receive start position for the designated communication device and receive window information (described later on). The communication device 3 can notify other communication devices of its presence within the wireless network by transmitting (broadcasting) its own management information. Other communication devices can verify the presence of the communication device 3 in the wireless network by receiving the management information of the communication device 3.

The communication device may, for example, be comprised of a wireless adapter card or PC card, or computer peripheral equipment of other configurations. The communication device may be mounted within external connection equipment (not shown in drawing) such as a personal computer or PDA (Personal Digital Assistant) to provide wireless transmission capability.

Figure 11:
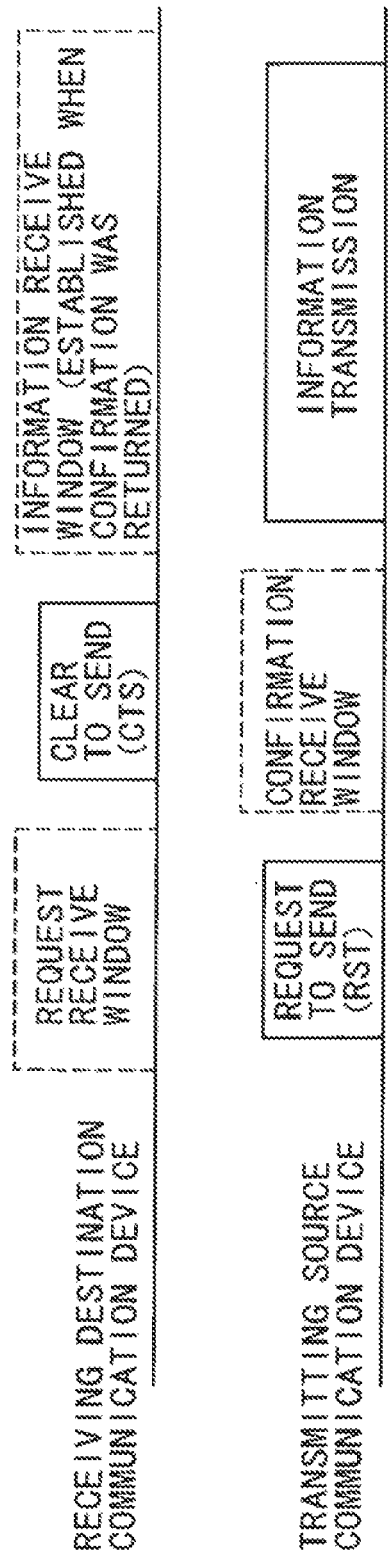
FIG. 11 is a drawing showing an example of setting widows between communication devices for transmitting information on an asynchronous wireless network in the second embodiment of the present invention.

FIG. 11 shows an example of window setting on communication devices for transmitting information on the asynchronous wireless network of the present embodiment.

The communication device at the receiving destination for the information sets a request receive window at a timing set beforehand. This receiving destination communication device also transmits (broadcasts) in advance management information containing receive window information.

On the other hand, the transmitting source communication device receives management information from the receiving destination communication device, and knows the request receive window of the receiving destination communication device ahead of time. When a request for information transmission is arises, this transmitting source communication device sends a communication request (RTS: Request to Send) to the receiving destination communication device by utilizing the request receive window of the receiving destination device.

Immediately after transmitting the RTS, the transmitting source communication device sets the confirmation receive window to receive a communication confirmation (CTS: Clear to Send) from the receiving destination device, and then stands by.

The receiving destination communication device returns the CTS in response to receiving the RTS from the transmitting source communication device. The receiving destination device further sets an information receive window for receiving information and then stands by for information transmission from the transmitting source communication device.

The transmitting source communication device transmits information in response to receiving the CTS from the receiving destination communication device. The receiving destination communication device then receives the information transmission using the previously set information receive window.

When an exchange of receipt confirmation is required after information transmission, the transmitting source communication device may set the receipt confirmation window T_Window and a receipt confirmation T may also be sent back to the transmitting source communication device from the receiving destination communication device.

Figure 12:
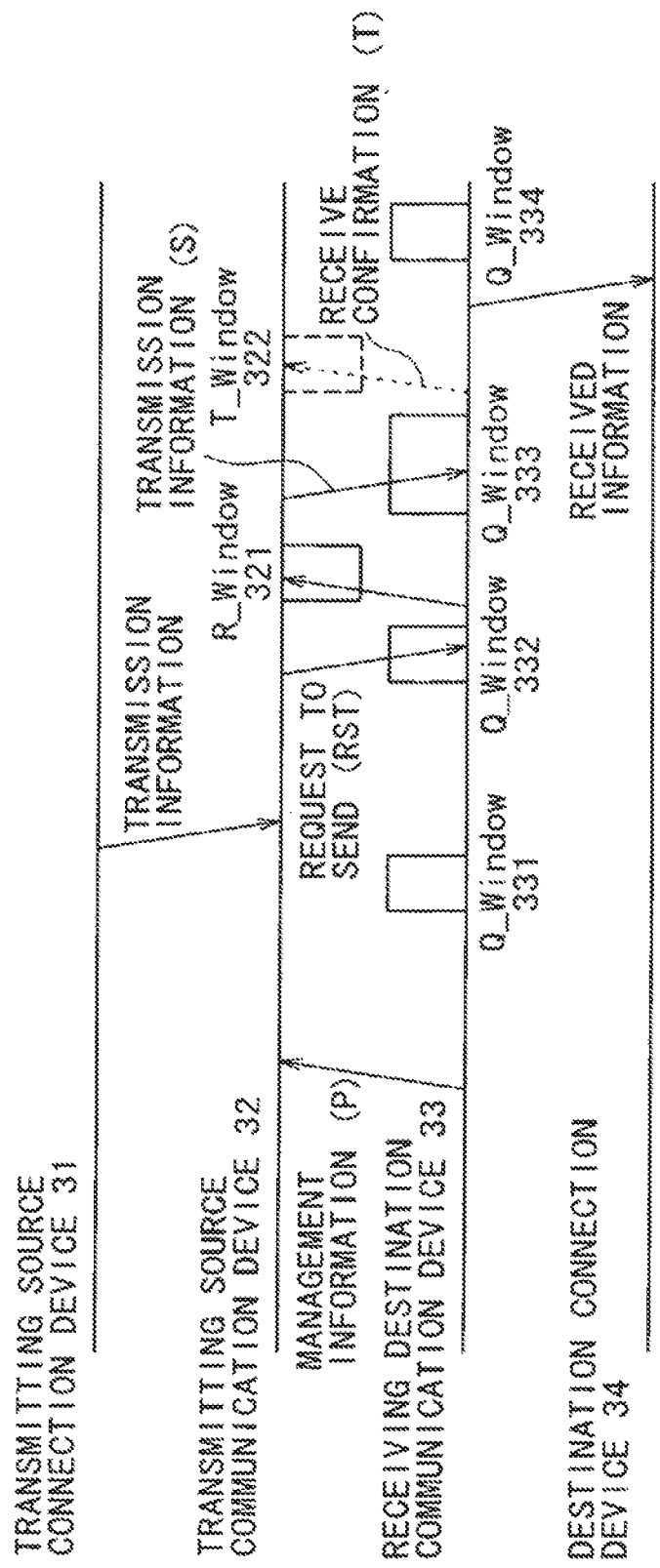
FIG. 12 is a schematic drawing showing the information transmission sequence between communication devices on an asynchronous wireless network in the second embodiment of the present invention.

FIG. 12 is a schematic drawing showing the information transmission sequence among the communication devices on an asynchronous network of the present embodiment. The example in the drawing shows the sequence for information exchange among the source connection device 31 serving as the transmitting source for the asynchronous information to be transmitted, the transmitting source communication device 32 serving as the source for transmitting the wireless communication, the receiving destination communication device serving as the destination for receiving the wireless communication, and the destination connection device 34 serving as the destination for conveying the asynchronous information.

To achieve information transmission, transmitting source communication device 32 is notified beforehand of management information P of the receiving destination communication device 33 within the wireless network. The management information (not shown in drawing) of the transmitting source communication device 32 is notified to the receiving destination communication device 33 in the same way.

The management information P of the receiving destination device 33 contains the timing for the request receive windows Q_Window 331, 332, 334 . . . set in the receiving destination device 33 itself. This information may also be specified for exchange among the communication devices at redundant time cycles. The transmitting source communication device 32 that received the management information P may know the timing for the request receive windows Q_Window 331, 332, 334 in advance.

The source connection device 31 for transmitting information such as a DVD player is connected the transmitting source communication device 32 via an interface. When transmission information is conveyed to the receiving destination communication device 33 from the transmitting source communication device 31, the timing of the nearest request receive window Q_Window 332 is utilized to transmit an RTS and immediately afterward set the confirmation receive window R_Window 321 for receiving the communication confirmation CTS.

If the receiving destination communication device 33 receives the RTS on the request receive window (set by communication device 33), then a CTS is set in response to the RTS, and the information receive window S_Window 333 is set for receiving information transmitted from the source of the communication request.

When the transmitting source communication device 32 receives the CTS, it utilizes the information receive window S_Window 333 to transmit information to the receiving destination communication device 33.

When an exchange of receipt confirmation is required after information transmission, the transmitting source communication device 32 sets the receipt confirmation window T_Window 322. The receipt confirmation T may also be sent back to the transmitting source communication device 32 from the transmitting source communication device 33.

The receiving destination communication device 33 is, for example, interface-connected to a destination connection device 34 for showing transmission information (or utilizing information in some other formats) such as a display. The receiving destination device 33 completes the information transmission sequence by outputting the information received from the transmitting source communication device 32 to the destination connection device 34.

Further, once a connection between the communication devices 32 and 33 has been secured by a sequence made up of the RTS and CTS, then information transmission may be continued while omitting the RTS/CTS sequence from that point.

FIG. 13 shows a configuration of management information P. The communication device transmits this management information for forming a wireless network, besides notifying its own receive window.

This management information is comprised of fields in which various kinds of information are written, including: communication device information showing a device number for the applicable wireless communication device; notification cycle information on management information for showing the management information notification cycle; receive request window information containing parameters for receiving requests; and communication device information on communication status for determining which communication devices are accessible.

The request receive window information contains information such as the timing and cycle for setting a receive window to receive an RTS from other communication devices. Therefore, other communication devices that received that management information can know, ahead of time, the timing set on the receive window of that communication device for receiving the RTS.

Information on other accessible communication devices may also be described in the management information. In this case, other devices that received the management information can understand the wireless communication environment of the corresponding communication device, that is, the structure of the asynchronous wireless network configured by the corresponding communication device that transmits (broadcasts) the management information at the specified notification cycle.

Besides the above basic structure, the management information may also be added as needed on the receiving destination communication device with other information or a CRC (Cyclic Redundancy Check) code for detecting if there are errors in the management information.

When a communication device transmits (broadcasts) management information according to the management information notification cycle that was set beforehand, other communication devices can periodically confirm the presence of that communication device.

Other communication devices can assume that a communication device whose notification cycle elapsed without its management information being received is probably no longer within the wireless network. This allows forming a wireless network of communication devices spatially present within an area in which their management information can be exchanged with each other.

Of course, the communication device need not always send management information periodically, and communication devices for whom a specified time has elapsed since management information was last received may be eliminated one after another from the network structure.

FIG. 14 is a schematic drawing showing the structure of an RTS (Request to Send). The transmitting source communication device can acquire the information receive window of the receiving destination communication device by sending an RTS to the receiving destination communication device.

This RTS is comprised of fields that include:
communication request transmitting source device information for showing the source of the communication request;
communication request receiving destination device information for showing the destination receiving the communication request; communication traffic information relating to the traffic during actual communication;

communication parameter information required for example in communications such as for exchanging receipt confirmation after a communication is completed; and a field in which a CRC code is written for detecting the presence or absence of errors in communication request information at the receiving destination communication device.

FIG. 15 is a schematic drawing showing the structure of a CTS (Clear to Send). When the communication device at the receiving destination receives an RTS (Request to Send) and accepts that request, it sends back a CTS to the communication device at the transmitting source.

This CTS is comprised of fields in which various kinds of information are written, including: communication confirmation transmitting source device information for showing the source of the communication confirmation;

communication confirmation receiving destination device information for showing the destination receiving the communication confirmation; communication traffic information relating to the traffic during actual communication;

communication parameter information required for example in communications such as for exchanging receipt confirmation after a communication is completed; and CRC coding for detecting the presence or absence of errors in communication confirmation information at the receiving destination device.

FIG. 16 is a schematic drawing showing the transmission information S to be sent by the transmitting source communication device to the receiving destination communication device. This transmission information S is made up of communication data information (payload) actually used in the communication and CRC coding for detecting transmission errors in communication data information at the receiving destination device.

FIG. 17 is a schematic drawing showing the receipt confirmation T. A receipt confirmation T is sent back to the transmitting source communication device when needed after receiving the transmission information S is completed. This receipt confirmation T is made up of information on data that was actually received and CRC coding for detecting the presence or absence of errors in receipt confirmation information at the receiving destination device.

Figure 18:
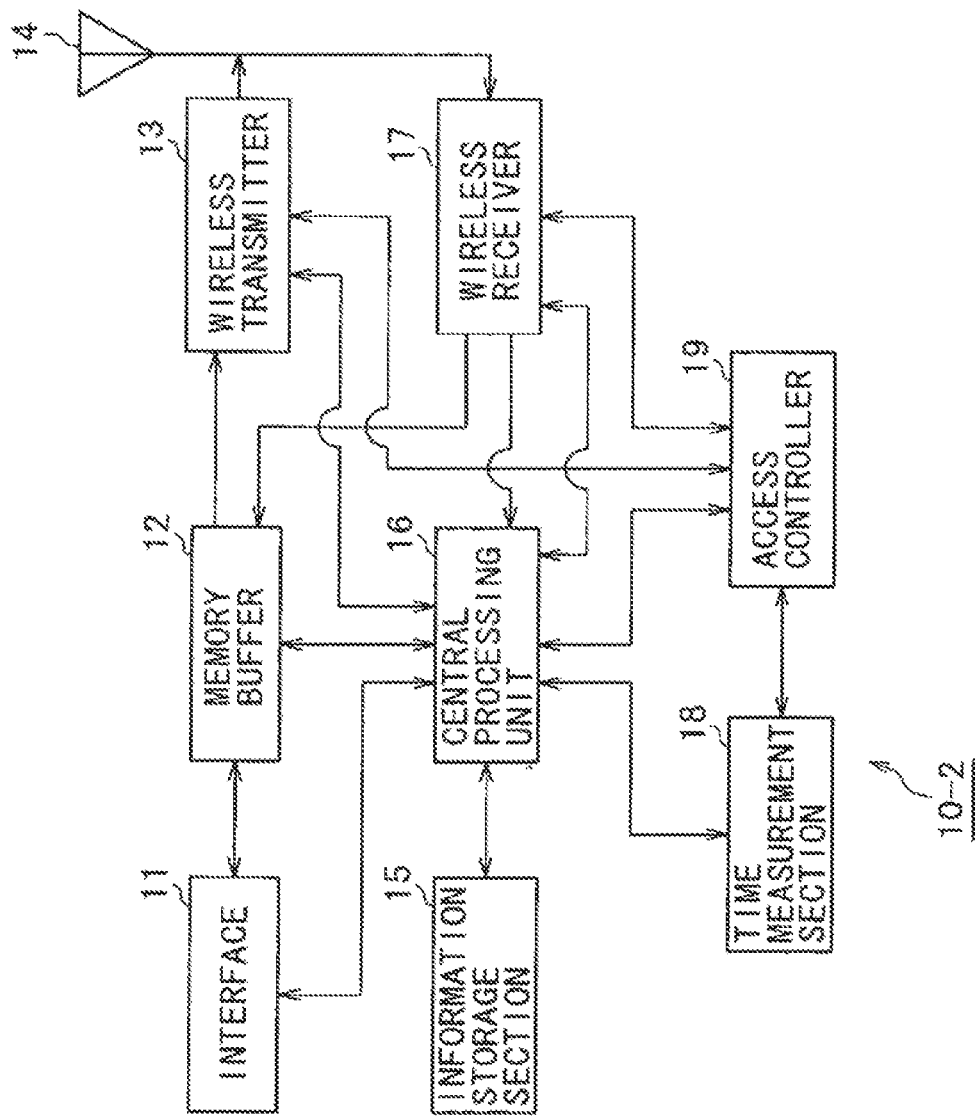
FIG. 18 is a block diagram showing the functional configuration of communication device 10-2 operable on an asynchronous wireless network in the second embodiment of the present invention.

FIG. 18 is a block diagram showing the functional configuration of the communication device 10-2 capable of operating on the asynchronous wireless network of the present embodiment. As shown in the figure, this communication device 10-2 is comprised of an interface 11, a memory buffer 12, a wireless transmitter 13, an antenna 14, an information storage section 15, a central processing unit 16, a wireless receiver 17, a time measurement section 18, and an access controller 19. However, other structures may also be used to achieve the same functions as the structure in the drawing so the invention is not limited to this structure.

The communication device 10-2 can also communicate asynchronously with other communication devices under the overall control of the central processing unit 16. The central processing unit 16 may, for example, be comprised of a microprocessor and controls the equipment operation during asynchronous communication by executing operating sequence commands (program codes) stored in the information storage section 15.

The parameters required for access control in asynchronous communication in the present embodiment are generated in the central processor unit 16 and stored in the memory buffer 12 as management information. These parameters are also stored in the access controller 19.

The management information is comprised of communication device information showing a device number assigned as an number unique to the communication device 10; notification cycle information on the management information showing the management information notification cycle; request receive window information holding parameters for receiving the request; communication device information for showing communication capability for identifying accessible communication devices (See FIG. 13.). Besides the above basic elements, the management information may further be added with CRC coding for detecting the presence or absence of errors in communication confirmation information at the receiving destination device and other information as needed.

The access controller 19 regulates the information transmission and information receive operation of the communication device 10 in the wireless network, based on time information from the time measurement section 18 and management information. The access controller 19 first sends instructions to the wireless transmitter 13 when the transmit timing has arrived. In response to the instruction from the access controller 19, the wireless transmitter 13 then sends the information stored in the buffer memory 12 from the antenna 14 as a wireless signal.

The access controller 19 also sends instructions to the wireless receiver 17 when the receive timing has arrived, based on time information from the time measurement section 18 and management information. The wireless receiver 17 then receives the wireless signal that was via the antenna 14.

If there is any information at the interface 11 supplied from a connected device (not shown in drawing), then the interface 11 stores that transmission information in the memory buffer 12 and also notifies the central processor unit 16 of information on the transmitting destination of that information. The central processor unit 16 then refers to other parameters received from other communication devices in the past that are stored in the information storage section 15 and sends instructions to the access controller 19 to process the transmission.

This information transmission operation is started based on instructions from the central processor unit 16, and then the access controller 19 operates according to the timing of the time measurement section 18.

The central processor unit 16 then refers to the notification cycle information in its own management information stored in the information storage section 15 and instructs the access controller 19 to transmit the management information set at the timing for transmitting its own management information within the management information exchange area. In response to that instruction, the access controller 19 then detects the transmit timing arrival based on time information from the time measurement section 18 and instructs the wireless transmitter 13 to send the management information at each specified notification cycle. The wireless transmitter 13 then reads out its own management information from the memory buffer 12 and transmits it via the antenna 14.

When the wireless receiver 17 has received management information in the management information exchange area from other communication devices, then that management information is supplied to the central processor unit 16. The central processor unit 16 then appropriately stores each parameter described in that management information into the information storage section 15. The management information is utilized when sending an RTS to the transmitting source communication device.

When transmitting information supplied by way of the interface 11, the central processor unit 16 temporarily stores the transmit information in the memory storage buffer 12. The central processor unit 16 also reads out the management information of the receiving destination communication device from the information storage section 15, acquires the request receive window information, and instructs the access controller 19 to send an RTS. The access controller 19 then detects the transmit timing arrival based on time information from the time measurement section 18 and instructs the wireless transmitter 13 to send the information synchronized with the request receive window of the communication device at the receiving destination. The wireless transmitter 13 then sends out the RTS via the antenna 14.

Immediately after the RTS is sent, the central processor unit 16 then instructs the access controller 19 to set the confirmation receive window to receive the CTS from the receiving destination communication device. The access controller 19 sets the confirmation receive window, detects the arrival of the receive timing based on time information from the time measurement section 18, and instructs the wireless receiver 17 to perform receive processing.

When the wireless receiver 17 receives, in the confirmation receive window, the CTS sent from the receiving destination communication device, the central processor unit 16 decodes this CTS and instructs the wireless transmitter 13 to send the transmission information. In response to this instruction, the wireless transmitter 13 reads out the transmission information from the memory buffer 12 and transmits it via the antenna 14.

When an exchange of receipt confirmation is required after sending the information, the central processor unit 16 instructs the access controller 19 right after the transmission ends, to set the receipt confirmation receive window. In response to this instruction, the access controller 19 sets the receipt confirmation receive window, detects the arrival of the receive timing based on time information from the time measurement section 18, and instructs the wireless receiver 17 to receive the receipt confirmation.

The central processor unit 16 instructs the access controller 19 to set the request receive window based on access control parameters that are set for the central processor 16. In response, the access controller 19 detects the arrival of the receive timing based on time information from the time measurement section 18, and instructs the wireless receiver 17 to receive the information in synchronization with its own request receive window.

When the wireless receiver 17 has received an RTS on the request receive window from another communication device, the central processor unit 16 decodes this RTS and instructs the wireless transmitter 13 to send back a CTS to the transmitting source communication device. The central processor unit 16 also instructs the access controller 19 to set the information receive window. The access controller 19 sets the information receive window, detects the arrival of the receive timing based on time information from the time measurement section 18, and instructs the wireless receiver 17 to receive the information in synchronization with the information receive window.

When the wireless receiver 17 has received transmission information addressed to its own wireless communication device 10, that information is stored in the memory buffer 12. The memory buffer 12 reconstructs that receive information and supplies it to a device connected by way of the interface 11 (not shown in drawing). Any other information is discarded if received.

When an exchange of receipt confirmation is required after sending the information, the central processor unit 16 instructs the wireless transmitter 13 to transmit the receipt confirmation after the receiving of transmission information in the information receive window from the transmitting source communication device is finished.

The device connected by way of the interface 11 is an information processing device such as a personal computer or a PDA. This type of information processing device does not basically have wireless communication functions. However, by connecting to the communication device 10-2, the data processed in the main unit can be sent by wireless transmission and the transmitted information from other devices can be received.

Figure 19:
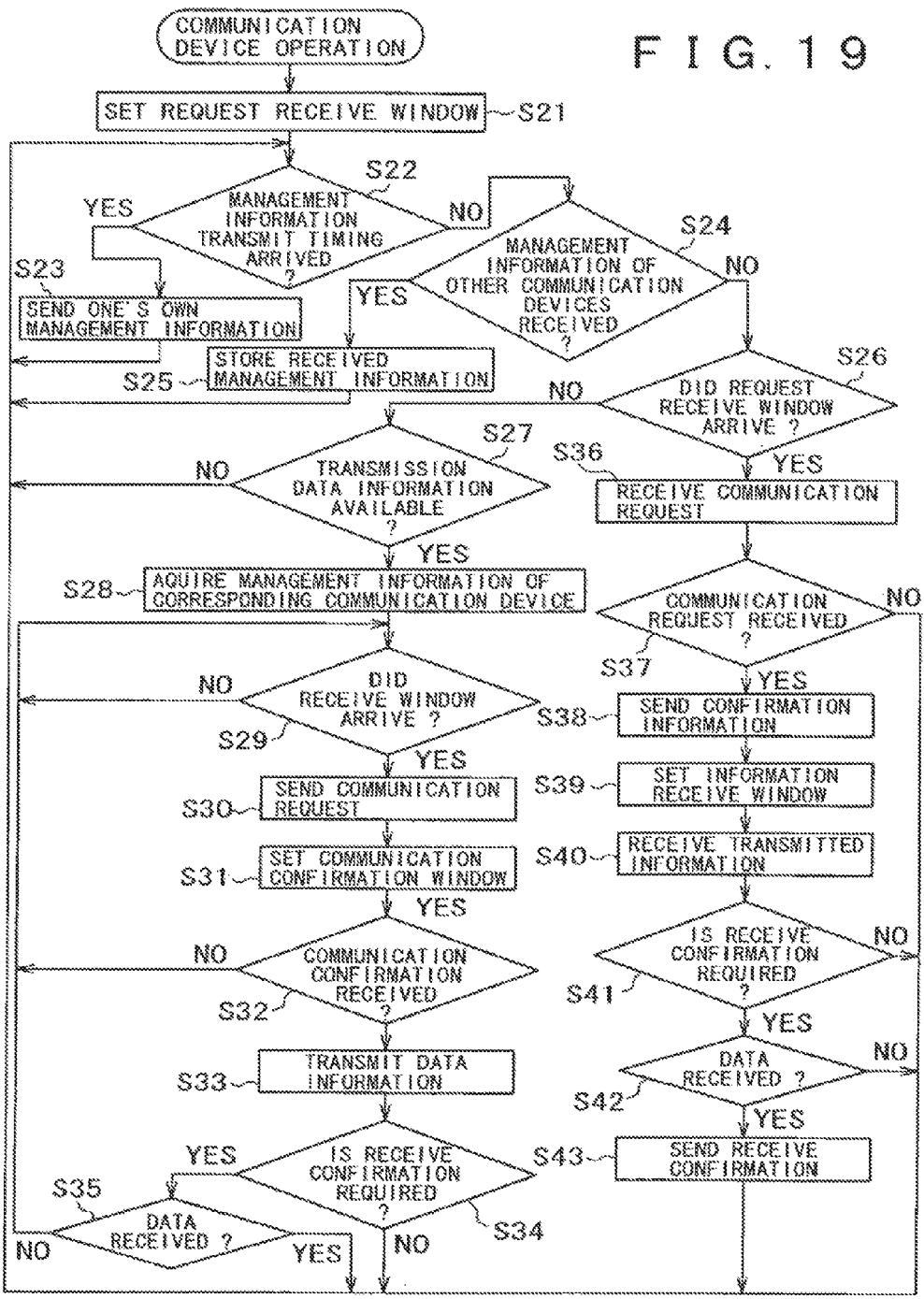
FIG. 19 is a flowchart showing the operating procedure for a communication device capable of communicating directly and asynchronously with other communication devices on a wireless network in the second embodiment of the present invention.

FIG. 19 is a flowchart showing the operating procedure of communication device 10-2 capable of carrying out direct asynchronous communication with other communication devices in the wireless network of the present embodiment. In the actual implementing of this operating procedure, the central processor 16 executes program codes stored in the information storage section 15. The operation for direct asynchronous communication in the wireless network of the present embodiment is described in detail below with reference to this flowchart.

When the power is turned on, the wireless communication device 10-2 first sets access control parameters including the management information notification cycle and request receive window information, and then sets the request receive window based on these parameters (step S21).

Next, the wireless communication device 10-2 decides whether its own management information timing has arrived (step S22). The transmit timing for the management information is determined during setting of the access control parameters of step S21. The management information transmit timing is set utilizing the management information exchange area so that conflicts do not mutually occur with other communication devices.

When the management information transmit timing has arrived, the operation branches from "Yes" of step S22 and proceeds to step S23. In step S23, its own device number and access control parameters are acquired, the management information configured (See FIG. 13), and this information temporarily stored in the memory buffer 12. The wireless transmitter 13 then reads out the management information from the memory buffer 12 and transmits (broadcasts) the management information to the wireless communication devices in the vicinity. After transmission, the process returns to step S22. By transmitting its own management information, the communication device 10 can in this way notify other wireless communication devices of its own presence in the wireless network.

At this time, the receiving of management information over a lengthy amount of time from another communication device can be attempted, and the management information may be transmitted at this receive timing.

On the other hand, when decided in step S22 that the transmit timing for its own management information has not arrived, then in step S24 a decision is again made on whether there is management information received from other communication devices.

When management information has been received from other communication devices, the process then shifts to the following step S25 from the "Yes" branch point of the decision diamond, the applicable management information is stored in the information storage section 15 and the process then returns to step S22. The management information is afterward utilized to acquire the timing for transmitting an RTS during information transmission to other applicable communication devices.

When decided in decision diamond S24 that management information was not received from other communication devices, the process shifts to the following step S26 from the "No" branch point of the decision diamond, and a decision made whether its own request receive window has arrived or not. When decided that the request receive window has not arrived, the process shifts to step S27 from the "No" branch point of that decision diamond. Here, in step S27, a decision is made whether data information transmitted from the device connected to the interface 11 was received.

If transmitted data information was received from the device connected to the interface 11, the process next shifts to step S28, and the request receive window information is then acquired from the management information of the receiving destination communication device stored in the information storage section 15. A decision is then made (step S29) on whether the receive timing of the receiving destination communication device has arrived.

The RTS is then sent (step S30) in response to the arrival of the receive timing of the receiving destination communication device. Further, after sending the RTS, the confirmation receive window is set (step S31) for receiving the CTS from the receiving destination communication device.

When the CTS was received on the communication confirmation window (step S32), the information is then transmitted (step S33).

After information transmission, a decision is made (step S34) on whether or not an exchange of receipt confirmation is required. If receipt confirmation is required, then a decision (step S35) is further made on whether or not there is a received receipt confirmation. When receipt confirmation is needed, a receive window is set for receiving receipt confirmations and the operation for receiving it from the receiving destination communication device is performed.

When receipt confirmation is not needed or when receipt confirmation has been received, the process returns to step S22 and the asynchronous wireless communication processing is sequentially repeated.

When decided in step S29 that the receive window has not arrived, or in step S32 when the CTS was not received, or in step S32 when the receipt confirmation was not received, then the process returns to step S29 and awaits the arrival of the next receive window.

On the other hand, when the request receive window has arrived in step S26, then the process next shifts to step S36 from the "Yes" branch point of that decision diamond. Operation to receive the RTS is performed and a decision made if the RTS was received from another communication device (step S37).

If the RTS was received from another communication device, a CTS is transmitted to the applicable transmitting source communication device (step 38), and also an information receive window is set for receiving information transmitted from the applicable transmitting source communication device (step S39) The information transmitted from the transmitting source communication device is then received on the information receive window (step S40).

A decision is made (step S41) on whether receipt confirmation is necessary after receiving the information transmission. If receipt confirmation is required, then a decision is made (step S42) on whether the data was correctly accepted or not. The receipt confirmation is then transmitted only if the data was correctly received (step S43). The process then returns to step S22 and the asynchronous wireless communication process is sequentially repeated.

When decided in step S37 that the RTS was not received on the request receive window, or when decided in step S41 that receipt confirmation is not needed, or when decided in step S42 that data was not accepted correctly, then the processes each return to step S22, and the asynchronous wireless communication process is sequentially repeated.

In the first embodiment of the present invention, the communication devices within the wireless network periodically establish receive windows and utilize management information to provide notification to other communication devices. The communication device at the transmitting source is structured to utilize the receive window of the receiving destination communication device for all transmission of information.

On the other hand, in the wireless network of the second embodiment of the present invention, asynchronous communication is performed by the RTS/CTS method. However, the communication device 10-2 utilizes the receive window that it was notified by the management information only during transmission of the RTS. The communication device 10-2 does not use the receive window as specified by management information in the sending/receiving of the CTS, sending/receiving of transmission information, and sending/receiving of receipt confirmation that follow. However, the communication device 10-2 does set the communication confirmation window, information receive window, receipt confirmation receive window in sequence in response to transactions such as sending/receiving of RTS and sending/receiving of CTS (See FIG. 11 and FIG. 12).

When performing asynchronous communication by the RTS/CTS method, a variation of the embodiment may be employed wherein only the receive window specified by the management information that was notified by the other communication party is utilized to perform all transmitting and receiving operations.

Figure 20:
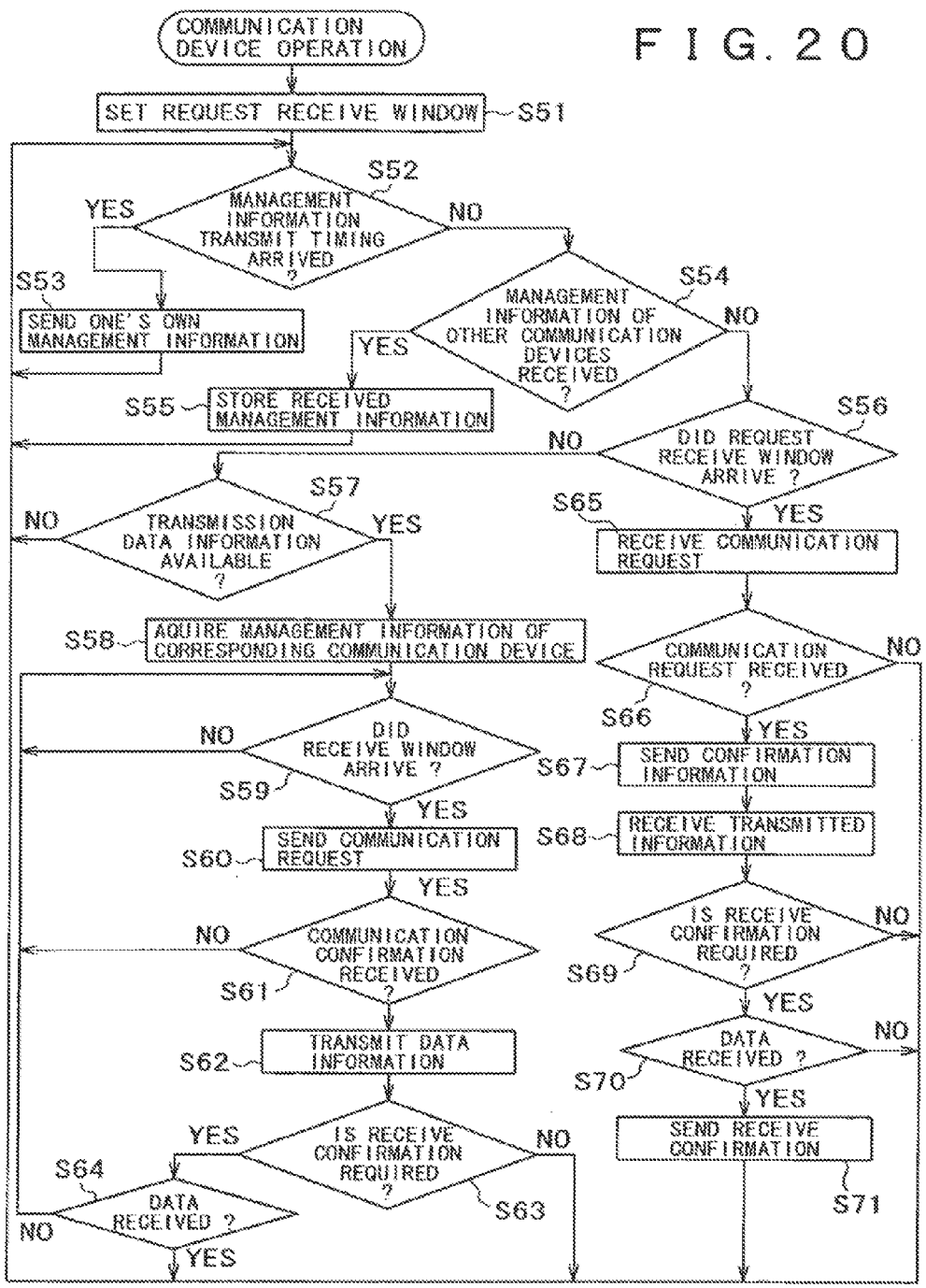
FIG. 20 is a flowchart showing a modified example of the operating procedure for a communication device for performing direct and asynchronous communication on a wireless network in the second embodiment of the present invention.

FIG. 20 is a flowchart showing the operating procedure for the communication device 10-2 to perform asynchronous communication by the RTS/CTS method utilizing only the receive window specified by management information notified to the communication device 10-2 from the other communication party. This operating procedure actually proceeds by executing program codes stored in the information storage section 15 by the central processor unit 16. The operation of this direct asynchronous communication is described in detail below with reference to this flowchart.

When the power is turned on, the wireless communication device 10-2 first sets access control parameters such as the management information notification cycle, and request receive window information, and then sets the request receive window based on these parameters (step S51).

Next, the wireless communication device 10-2 decides whether the transmit timing for its own management information has arrived (step S52). The transmit timing for the management information is determined during setting of the access control parameters of step S51. The transmit timing for the management information is set utilizing the management information exchange area so that conflicts do not mutually occur with other communication devices.

When the transmit timing for the management information has arrived, the operation branches from "Yes" of step S52 and proceeds to step S53. In step S53, its own device number and access control parameters are acquired, the management information configured (See FIG. 13), and this information temporarily stored in the memory buffer 12. The wireless transmitter 13 then reads out the management information from the memory buffer 12 and transmits (broadcasts) the management information to the wireless communication devices in the vicinity. After transmission, the process returns to step S52. By transmitting its own management information, the communication device 10-2 can in this way notify other wireless communication devices of its own presence in the wireless network.

At this time, the receiving of management information from another communication device over a lengthy amount of time can be attempted, and the management information may be transmitted at this receive timing.

On the other hand, when decided in step S52 that the transmit timing for its own management information has not arrived, then in step S54 a decision is again made on whether there is management information received from other communication devices.

When management information has been received from other communication devices, the process then shifts to the following step S55 from the "Yes" branch point of the decision diamond, the applicable management information is stored in the information storage section 15 and the process then returns to step S52. This management information is afterward utilized to acquire the timing for transmitting the RTS during information transmission to other applicable communication devices.

When decided in decision diamond S54 that management information was not received from other communication devices, the process shifts to the following step S56 from the "No" branch point of the decision diamond, and a decision made whether its own request receive window has arrived or not. When decided that the request receive window has not arrived, the process shifts to step S57 from the "No" branch point of that decision diamond. Here in step S57, a decision is made whether data information transmitted from the device connected to the interface 11 was received.

If receiving transmit data information from the device connected to the interface 11, the process next shifts to step S58 and the request receive window information is then acquired from the management information of the receiving destination communication device stored in the information storage section 15. A decision is then made (step S59) on whether the receive timing of the receiving destination communication device has arrived. The RTS is then sent (step S60) in response to the arrival of the receive timing of the receiving destination communication device.

Next, receive operation is attempted (step S61) on the following receive window of the communication device 10-2 for receiving the CTS from the communication device on the receiving side. If the CTS could be received, then the information is transmitted (step S62) after awaiting arrival of the nearest receive window of the communication device on the receiving side.

After information transmission, a decision is made (step S63) on whether or not an exchange of receipt confirmation is required. If receipt confirmation is required, then a decision is further made on whether or not there is a received receipt confirmation (step S64). When receipt confirmation is needed, a receive window is set for receiving receipt confirmation and the receipt confirmation is received from the receiving destination communication device.

When receipt confirmation is not needed or when receipt confirmation has been received, the process then returns to step S52 and the asynchronous wireless communication processing is sequentially repeated.

When decided in step S59 that the receive window has not arrived, or in step S61 when the CTS was not received, or in step S64 when the receipt confirmation was not received, then the process returns to step S59 and awaits the arrival of the next receive window.

On the other hand, when the request receive window has arrived in step S56, then the process next shifts to step S65 from the "Yes" branch point of that decision diamond. Operation to receive the RTS is performed and a decision made if RTS was received from another communication device (step S66).

If the RTS was received from another communication device, then the management information of the applicable transmitting source communication device is acquired from the information storage section 15, and the CTS is transmitted (step S67) after awaiting arrival of the nearest receive window. The information transmitted from the transmitting source communication device is then received on its own receive window (step S68).

After receiving the transmitted information, a decision is then made (step S69) on whether receipt confirmation is necessary. If receipt confirmation is required, then a decision is made (step S70) on whether the data was correctly accepted or not. And only when the data was correctly received, the receipt confirmation is transmitted (step S71) after awaiting arrival of the nearest receive window on the transmitting source communication device side. The process then returns to step S52 and the asynchronous wireless communication process is sequentially repeatedly.

When decided in step S66 that the RTS was not received on the request receive window, or when decided in step S69 that receipt confirmation is not needed, or when decided in step S70 that data was not accepted correctly, then the processes each return to the appropriate step, and the asynchronous wireless communication process is sequentially repeated.

Supplemental Information

The above information described the present invention while referring to the designated embodiments. However, as is clear to one skilled in the art, revisions and substitutions may be made to the embodiments without departing from the scope and spirit of the present invention.

The examples in the present specifications applied the present invention to a wireless network for performing asynchronous information transmission. Of course, the present invention can also be preferably applied to synchronous information communication networks.

In other words, the present invention was disclosed by using examples and should not be interpreted as being limited by the contents of the present specifications. To determine the substance of the present invention; one should refer to the section containing the patent claims in this document.

INDUSTRIAL APPLICABILITY

The present invention is capable of providing an excellent wireless communication system and wireless communication control method, wireless communication devices and wireless communication method as well as a computer program, which are able to form a wireless network for direct asynchronous communication while terminals mutually confirm the presence of other terminals. In other words, the present invention is capable of direct asynchronous communication between wireless communication devices without having to install a device that serves as the control station.

The present invention is also capable of asynchronous information transmission without the communication devices being in constant receiving standby. In other words, the wireless communication device notifies information on its own receive timing, receive window and receive cycle in advance, so that by receiving on that window, the communication devices can operate the receive function with low power consumption because unlike the case of the related art, there is no need to remain in constant receiving standby.

The present invention is also capable of information transmission based on management information of other communication devices that its communication device received in the past. Wireless transmission can in this way be performed without obtaining a means to check in advance on the use of transmission lines so that information transmission is performed in a comparatively short time.

An access control method can therefore be provided that is capable of preventing communication conflicts during asynchronous wireless communication without, for example, having to utilize a random access control method that controls collision avoidance by carrier sensing.

Access control not prone to communication conflicts between multiple communication devices can also be achieved by shifting the receive timing to be set on multiple communication devices so as to prevent overlapping.

An access control method effective for use with multiple communication devices can also be achieved without having to install a control station or access point that serves as a basis in the wireless network, by installing a management information exchange area in synchronization to exchange management information between multiple communication devices.

Furthermore, a wireless network system for configuring an autonomous wireless network can be achieved within the communication range of a wireless communication device without defining the wireless network strictly, by providing a function to decide there is no longer a connection with a wireless communication device and delete it from the memory when no signals containing the identifier and timing information are received from that wireless communication device over a certain length of time.

Furthermore, in situations when transmission with a guaranteed quality of service (QoS) is required, wireless communication with a guaranteed QoS can be easily achieved by communicating management information to notify that transmission will be made with a guaranteed QoS as, for example, in reserved transmissions.

Furthermore, by sending the management information of a communication device to notify the presence or absence of the other communication devices capable of communicating with that communication device, the structural area for a wireless network centering on that communication device can clearly be shown.

According to the present invention, there is provided an excellent wireless communication system and wireless communication control method, a wireless communication device and wireless communication method as well as a computer program, which are capable of asynchronous wireless communication by RTS/CTS access control without the communication device being in constant receiving standby for detecting RTS signals.

According to the present invention, each wireless communication device performs the minimum required receive operation by respectively setting a minimum required receive window while mutually exchanging the management information, so that an RTS/CTS connection sequence can be achieved. Unlike the related art, there is therefore no need to be in constant receiving standby, so operation with low power consumption is achieved. Since the receive window need only detect if there is information addressed to its own communication device, an extremely short receive window can be set so that operation with exceptionally low power consumption is achieved.

The receive operation can be simplified by setting the respective receive windows as needed, since there is no need to receive and decode all information flowing on the transmission lines even during super high speed wireless transmissions.

Information addressed to one's own communication device can be acquired without having to utilize a high speed processor for receiving information sent in a super high speed transmission.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A wireless communication device having a capability of direct communication with another wireless communication device, without having to install an access point in a wireless network, comprising:
   circuitry configured to
      generate management information describing a plurality of receive operation periods or absence operation periods in a predetermined time interval;
      transmit the management information once every passage of the predetermined time interval directly to the another wireless communication device without utilizing any access control from the access point;
      control the timing of the receive operation or the absence operation, without being in a constant active receiving or monitoring operation of the wireless communication device, based on the management information; and
      receive information directly from the another wireless communication device without utilizing any access control from the access point,
   wherein the management information notifying the receive operation period or the absence operation period includes duration information, interval information, and start time information.

2. The wireless communication device according to claim 1, wherein the circuitry is further configured to transmit the management information at each of one or more specified notification intervals.

3. The wireless communication device according to claim 1, wherein the circuitry is further configured to receive the information from the another wireless communication device at a timing that is not coinciding with the operation of the wireless communication device.

4. The wireless communication device according to claim 1, wherein the circuitry comprises:
   a memory buffer, and
   an interface configured to store the management information in the memory buffer.

5. The wireless communication device according to claim 1, wherein the transmission of the management information to the another wireless communication device is implemented in accordance with an ad-hoc wireless network configuration.

6. The wireless communication device according to claim 1, wherein the transmission of the management information to the another wireless communication device is implemented in accordance with an asynchronous wireless communication configuration.

7. The wireless communication device according to claim 6, wherein an access control of the wireless communication device is implemented in accordance with a Carrier Sense Multiple Access with Collision Avoidance (CSMA/CA) protocol.

8. The wireless communication device according to claim 1, wherein the management information further includes a Cyclic Redundancy Check (CRC).

9. The wireless communication device according to claim 1, wherein the circuitry comprises a memory buffer, wherein the management information is stored in the memory buffer.

10. The wireless communication device according to claim 1, wherein the circuitry comprises an antenna,
wherein the management information is stored in a memory buffer and is transmitted from the antenna.

11. The wireless communication device according to claim 1, wherein the wireless communication device further comprises:
a time measurement section, and
an access controller configured to operate according to a timing of the time measurement section.

12. The wireless communication device according to claim 11, wherein the controlling of the timing of the operation of the wireless communication device based on the management information is controlled according to the timing of the time measurement section.

13. The wireless communication device according to claim 1, wherein the circuitry comprises:
a interface; and
a processing circuitry configured to store information in a buffer when the management information is supplied by way of the interface.

14. The wireless communication device according to claim 1, wherein the circuitry comprises:
an information storage, and
a processor circuitry configured to read out the management information from the information storage.

15. The wireless communication device according to claim 1, wherein the wireless communication device further comprises:
a display configured to display the received information.

16. A wireless communication control method used for direct communication between wireless communication devices, without having to install an access point in a wireless network, comprising:
generating management information describing a plurality of receive operation periods or absence operation periods in a predetermined time interval;
transmitting the management information once every passage of the predetermined time interval directly to another wireless communication device without utilizing any access control from the access point;
controlling the timing of the receive operation or the absence operation, without being in a constant active receiving or monitoring operation of the wireless communication device, based on the management information; and
receiving information directly from the another wireless communication device without utilizing access control from the any access point;
wherein the management information notifying the receive operation period or the absence operation period includes duration information, interval information, and start time information.

17. The wireless communication control method according to claim 16, wherein the management information is transmitted at each of one or more specified notification intervals.

18. The wireless communication control method according to claim 16, wherein the information is received from the another wireless communication device at a timing that is not coinciding with the operation of the wireless communication device.

19. The wireless communication control method according to claim 16, wherein the management information is stored in a memory buffer prior to transmission to the another wireless communication device.

20. The wireless communication control method according to claim 16, wherein the transmission of the management information to the another wireless communication device is implemented in accordance with an ad-hoc wireless network configuration.

21. The wireless communication control method according to claim 16, wherein the transmission of the management information to the another wireless communication device is implemented in accordance with an asynchronous wireless communication configuration.

22. The wireless communication control method according to claim 21, wherein an access control of the wireless communication device is implemented in accordance with a Carrier Sense Multiple Access with Collision Avoidance (CSMA/CA) protocol.

23. The wireless communication control method according to claim 16, wherein the management information further includes a Cyclic Redundancy Check (CRC).

24. The wireless communication control method according to claim 16, wherein the management information is stored in a memory buffer prior to transmission to the another wireless communication device, and the management information is transmitted through an antenna to the another wireless communication device.

25. The wireless communication control method according to claim 16, wherein an access to the wireless communication device is controlled according to a predetermined timing.

26. The wireless communication control method according to claim 16, wherein the management information is stored in a buffer when the management information is supplied by way of an interface.

27. The wireless communication control method according to claim 16, wherein the management information is read out from an information storage.

28. The wireless communication control method according to claim 16, wherein the received information is displayed on a display.

* * * * *